(12) United States Patent
Byun et al.

(10) Patent No.: US 12,189,032 B2
(45) Date of Patent: Jan. 7, 2025

(54) LiDAR APPARATUS HAVING IMPROVED SIGNAL-TO-NOISE RATIO

(71) Applicant: SAMSUNG ELECTRONICS CO., LTD., Suwon-si (KR)

(72) Inventors: Hyunil Byun, Seongnam-si (KR); Dongjae Shin, Seoul (KR); Changgyun Shin, Anyang-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1045 days.

(21) Appl. No.: 17/135,228

(22) Filed: Dec. 28, 2020

(65) Prior Publication Data

US 2022/0003870 A1     Jan. 6, 2022

(30) Foreign Application Priority Data

Jul. 3, 2020    (KR) ........................ 10-2020-0082264

(51) Int. Cl.
*G01C 3/08*      (2006.01)
*G01K 13/00*      (2021.01)
(Continued)

(52) U.S. Cl.
CPC .............. *G01S 17/58* (2013.01); *G01K 13/00* (2013.01); *G01S 7/4811* (2013.01); (Continued)

(58) Field of Classification Search
CPC ...... G01S 17/58; G01S 7/4811; G01S 7/4913; G01K 13/00; G02F 1/3137; G02F 2203/50
See application file for complete search history.

(56) References Cited

U.S. PATENT DOCUMENTS 10,678,117 B2    6/2020    Shin et al.
11,061,140 B2 *   7/2021    Hosseini ............... G01S 7/4813
(Continued)

FOREIGN PATENT DOCUMENTS

CN      110770600 A     2/2020
JP       6-289137 A      10/1994
(Continued)

OTHER PUBLICATIONS

Communication dated Jun. 17, 2021, issued by the European Patent Office in European Application No. 21150252.1.
(Continued)

*Primary Examiner* — Mark Hellner
(74) *Attorney, Agent, or Firm* — Sughrue Mion, PLLC

(57) ABSTRACT

Provided is a light detection and ranging (LiDAR) apparatus including a light source configured to generate light, an optical transmitter configured to emit the light generated by the light source to outside of the LiDAR apparatus, an optical receiver configured to receive light from the outside of the LiDAR apparatus, a resonance-type photodetector configured to selectively amplify and detect light having a same wavelength as a wavelength of light generated by the light source among the light received by the optical receiver, and a processor configured to control the light source and the resonance-type photodetector, wherein the resonance-type photodetector includes a resonator, a phase modulator provided on the resonator and configured to control a phase of light traveling along the resonator based on control of the processor, and an optical detector configured to detect an intensity of the light traveling along the resonator.

22 Claims, 16 Drawing Sheets

(51) Int. Cl.
  *G01S 7/481* (2006.01)
  *G01S 7/4913* (2020.01)
  *G01S 17/58* (2006.01)
  *G01S 17/931* (2020.01)
  *G02F 1/313* (2006.01)

(52) U.S. Cl.
  CPC .......... *G01S 7/4913* (2013.01); *G01S 17/931* (2020.01); *G02F 1/3137* (2013.01); *G02F 2203/50* (2013.01)

(56) References Cited

U.S. PATENT DOCUMENTS

| | | | |
|---|---|---|---|
| 2018/0224299 A1* | 8/2018 | Wiebold | G01S 17/58 |
| 2018/0267250 A1 | 9/2018 | Hosseini et al. | |
| 2018/0306925 A1 | 10/2018 | Hosseini et al. | |
| 2019/0235053 A1 | 8/2019 | Spector et al. | |
| 2020/0049820 A1 | 2/2020 | Choi et al. | |
| 2020/0103502 A1 | 4/2020 | Talty et al. | |

FOREIGN PATENT DOCUMENTS

| | | |
|---|---|---|
| KR | 10-2018-0020035 A | 2/2018 |
| WO | 2017/099803 A1 | 6/2017 |

OTHER PUBLICATIONS

Poulton et al., "Coherent solid-state LIDAR with silicon photonic optical phased arrays," Optical Society of America, Optics Letters, vol. 42, No. 20, Oct. 15, 2017, pp. 4091-4094.

Tu et al., "State of the Art and Perspectives on Silicon Photonic Switches," MDPI, Micromachines, vol. 10, No. 51, 2019, Total 19 pages.

Ren et al., "High-Responsivity Silicon Microring Photodetector Based on Two-Photon Absorption," IEICE, TuE3-2, OECC/PSC 2019, Total 3 pages.

Wikipedia, "Phased array," Retrieved from "https://en.wikipedia.org/w/index.php?title=Phased_array&oldid=991879618", Dec. 2020, Total 8 pages.

Sun et al., "Tunable silicon Fabry—Perot comb filters formed by Sagnac loop mirrors," Optical Society of America, Optics Letters, vol. 38, No. 4, Feb. 15, 2013, pp. 567-569.

* cited by examiner

LiDAR APPARATUS HAVING IMPROVED SIGNAL-TO-NOISE RATIO

CROSS-REFERENCE TO RELATED APPLICATION

This application claims priority to Korean Patent Application No. 10-2020-0082264, filed on Jul. 3, 2020, in the Korean Intellectual Property Office, the disclosure of which is incorporated by reference herein in its entirety.

BACKGROUND

1. Field

Example embodiments of the present disclosure relate to light detection and ranging (LiDAR) apparatuses, and more particularly, to LiDAR apparatuses having an improved signal-to-noise ratio.

2. Description of Related Art

Recently, advanced driving assistance systems (ADAS) having various functions have been commercialized. For example, there is a tendency of increasing the number of vehicles equipped with functions, such as an adaptive cruise control (ACC) which reduces a speed of a vehicle if there is a risk of collision and the vehicle is driven within a set speed range if there is no risk of collision by recognizing a location and speed of another vehicle and an autonomous emergency braking system (AEB) which automatically applies a brake to prevent collisions when there is a risk of collision by recognizing the vehicle in front, but the driver does not respond to the risk or the response method is inappropriate. In addition, it is expected that cars capable of autonomous driving will be commercialized in the near future.

Accordingly, the importance of a vehicle radar that provides forward information of a vehicle is gradually increasing. For example, light detection and ranging (LiDAR) sensors are widely used as vehicle radars. The LiDAR sensors measure a distance, speed, azimuth, and position of an object from the time when a laser scattered or reflected returns, changes in the intensity of the laser, changes in the frequency of the laser, and changes in the polarization state of the laser.

SUMMARY

Additional aspects will be set forth in part in the description which follows and, in part, will be apparent from the description, or may be learned by practice of example embodiments of the disclosure.

According to an aspect of an example embodiment, there is provided a light detection and ranging (LiDAR) apparatus including a light source configured to generate light, an optical transmitter configured to emit the light generated by the light source to outside of the LiDAR apparatus, an optical receiver configured to receive light from the outside of the LiDAR apparatus, a resonance-type photodetector configured to selectively amplify and detect light having a same wavelength as a wavelength of light generated by the light source among the light received by the optical receiver, and a processor configured to control the light source and the resonance-type photodetector, wherein the resonance-type photodetector includes a resonator, a phase modulator provided on the resonator and configured to control a phase of light traveling along the resonator based on control of the processor, and an optical detector configured to detect an intensity of the light traveling along the resonator.

The processor may be further configured to provide the light generated by the light source to the resonator before providing the light to the optical transmitter; match a resonance wavelength of the resonator with the wavelength of light generated by the light source by adjusting phase of light traveling along the resonator by controlling the phase modulator; and provide the light generated by the light source to the optical transmitter after determining the resonance wavelength of the resonator.

The processor may be further configured to determine that the resonance wavelength of the resonator is matched with the wavelength of light generated by the light source when an intensity of light detected by the resonance-type photodetector reaches a maximum value while adjusting the phase of the light traveling along the resonator by controlling the phase modulator.

The LiDAR apparatus may further include a temperature sensor configured to measure a temperature of the light source, wherein the processor is configured to determine the wavelength of the light generated by the light source based on the temperature measured by the temperature sensor, and based on the wavelength of light generated by the light source changes beyond a predetermined range, match the resonance wavelength of the resonator with the wavelength of light generated by the light source by adjusting the phase of light traveling along the resonator by controlling the phase modulator.

The LiDAR apparatus may further include a first waveguide provided between the light source and the optical transmitter, a second waveguide provided between the light source and the resonator, a third waveguide provided between the optical receiver and the resonator, and an optical switch configured to provide the light generated by the light source to the first waveguide or to the second waveguide based on a control of the processor.

The LiDAR apparatus may further include an additional optical detector connected to an end of the third waveguide, the additional optical detector being configured to measure an intensity of external noise.

The LiDAR apparatus may further include an optical coupler on the first waveguide, wherein an end of the second waveguide extends to the optical coupler, and a portion of the light provided to the optical transmitter through the first waveguide is provided to the resonator through the optical coupler and the second waveguide.

The light source may include a continuous wave light source that is configured to generate continuous wave light, and wherein the processor is further configured to control the light source such that the light source generates frequency modulated light, and extract at least one of distance information of an external object and speed information of the external object in a frequency modulated continuous wave (FMCW) method.

The resonator may include a first resonator and a second resonator having different optical path lengths and optically connected to each other, wherein the phase modulator includes a first phase modulator provided on the first resonator and configured to control a phase of light traveling along the first resonator based on a control of the processor, and a second phase modulator provided on the second resonator and configured to control a phase of light traveling along the second resonator based on a control of the processor, and wherein the optical detector includes a first optical detector configured to detect an intensity of the light traveling along the first resonator and a second optical detector configured to detect an intensity of the light traveling along the second resonator.

The processor may be further configured to provide the light generated by the light source to the first resonator before providing the light generated by the light source to the optical transmitter, match a resonance wavelength of the first resonator with the wavelength of light generated by the light source by adjusting the phase of light traveling along the first resonator by controlling the first phase modulator, match a resonance wavelength of the second resonator with the wavelength of light generated by the light source by adjusting the phase of light traveling along the second resonator by controlling the second phase modulator, and provide the light generated by the light source to the optical transmitter after determining the resonance wavelength of the first resonator and the resonance wavelength of the second resonator.

The LiDAR apparatus may further include a first waveguide provided between the light source and the optical transmitter, a second waveguide provided between the light source and the first resonator, a third waveguide provided between the optical receiver and the second resonator, and an optical switch configured to provide the light generated by the light source to the first waveguide or to the second waveguide based on a control of the processor.

The LiDAR apparatus may further include a first waveguide provided between the light source and the optical transmitter, an optical coupler provided on the first waveguide, a second waveguide provided between the optical coupler and the resonator, and a third waveguide provided between the optical receiver and the resonator, wherein a portion of the light provided to the optical transmitter through the first waveguide is provided to the resonator through the optical coupler and the second waveguide.

The resonator may include a closed curve waveguide resonator.

The resonator may include a first loop-type mirror and a second loop-type mirror provided on a waveguide, and the phase modulator and the optical detector may be provided on the waveguide between the first loop-type mirror and the second loop-type mirror.

The LiDAR apparatus may further include a first waveguide provided between the light source and the optical transmitter, a second waveguide provided between the light source and the first loop-type mirror, a third waveguide provided between the optical receiver and the second loop-type mirror, and an optical switch configured to provide the light generated by the light source to the first waveguide or to the second waveguide based on a control of the processor.

The optical transmitter and the optical receiver respectively may include optical phased array (OPA) devices.

The optical transmitter may further include a substrate, a plurality of waveguides provided on the substrate, a plurality of splitters respectively including an input terminal connected to one waveguide among the plurality of waveguides and an output terminal connected to at least two waveguides among the plurality of waveguides, a plurality of phase control elements configured to independently control phases of a plurality of pieces of light split by the plurality of splitters, and a plurality of grating pattern groups respectively connected to the plurality of phase control elements and configured to emit the plurality of pieces of light of which phases are controlled.

The light source, the optical transmitter, the optical receiver, and the resonance-type photodetector may be provided on a substrate.

The processor may be further configured to control an azimuth direction of the light emitted by the optical transmitter by adjusting the phases of split light by controlling the plurality of phase control elements, and control an elevation angle direction of the light emitted by the optical transmitter by controlling the wavelength of the light generated by the light source.

The processor may be further configured to match a resonance wavelength of the resonator with the wavelength of the light generated by the light source by controlling the phase modulator based on a change in the elevation angle direction of the light emitted by the optical transmitter.

The processor may be further configured to control the light source to generate light of a first wavelength, provide the light of the first wavelength generated by the light source to the resonator, match the resonance wavelength of the resonator with the first wavelength by adjusting the phase of light traveling along the resonator by controlling the phase modulator, control an azimuth direction of the light emitted by the optical transmitter by controlling the plurality of phase control elements while providing the light of the first wavelength generated by the light source to the optical transmitter, control the light source to generate light of a second wavelength, provide the light of the second wavelength generated by the light source to the resonator, match the resonance wavelength of the resonator with the second wavelength by adjusting the phase of light traveling along the resonator by controlling the phase modulator, and control an azimuth direction of the light emitted by the optical transmitter by controlling the plurality of phase control elements while providing the light of the second wavelength generated by the light source to the optical transmitter.

The optical transmitter and the optical receiver may be integrally combined as one optical transceiver.

The LiDAR apparatus may further include a first waveguide provided between the light source and the optical transceiver, a second waveguide provided between the light source and the resonator, a third waveguide provided between the optical transceiver and the resonator, an optical switch configured to provide the light generated by the light source to the first waveguide or to the second waveguide based on a control of the processor, and an optical coupler provided on the first waveguide, wherein an end of the third waveguide is connected to the optical coupler, and the optical coupler is configured to transmit the light received from the optical transceiver to the third waveguide.

The LiDAR apparatus may further including an optical circulator configured to output light incident on a first port of the optical circulator to a second port of the optical circulator, and output light incident on the second port of the optical circulator to a third port of the optical circulator, a first waveguide connected between the light source and the first port of the optical circulator, an optical coupler provided on the first waveguide, a second waveguide connected between the resonator and the optical coupler, and a third waveguide connected between the third port of the optical circulator and the resonator, wherein the optical transceiver is connected to the second port of the optical circulator.

According to an aspect of an example embodiment, there is provided a light detection and ranging (LiDAR) apparatus including a light source configured to generate light, an optical transmitter configured to emit the light generated by the light source to an outside of the LiDAR apparatus, an optical receiver configured to receive light from the outside of the LiDAR apparatus, a resonance-type photodetector configured to selectively amplify and detect light having a same wavelength as a wavelength of light generated by the light source among the light received by the optical receiver, and a processor configured to control the light source and the resonance-type photodetector, wherein the resonance-type photodetector includes a resonator, a phase modulator provided on the resonator and configured to control a phase of light traveling along the resonator based on control of the processor, a first optical detector configured to detect an intensity of the light traveling along the resonator, a first waveguide provided between the light source and the optical transmitter, a second waveguide provided between the light source and the resonator, a third waveguide provided between the optical receiver and the resonator, and an optical switch configured to be connected to the first waveguide or to the second waveguide.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
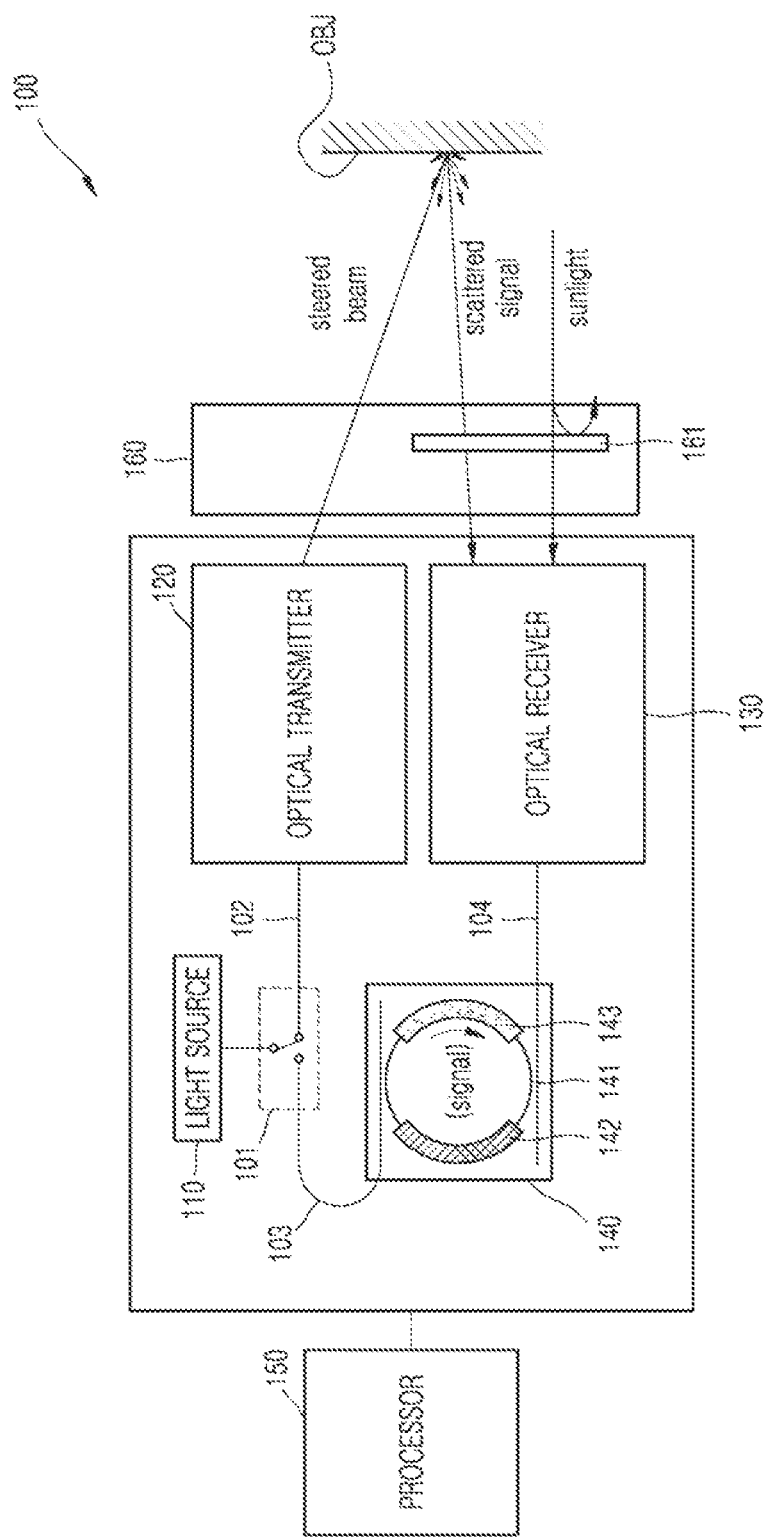
FIG. 1 is a schematic block diagram showing a configuration of a LiDAR apparatus according to an example embodiment.

Reference will now be made in detail to example embodiments of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, a light detection and ranging (LiDAR) apparatus having an improved signal-to-noise ratio will be described in detail with reference to the accompanying drawings. In the drawings, like reference numerals denote like elements and sizes of constituent elements may be exaggerated for convenience of explanation and clarity. The example embodiments are capable of various modifications and may be embodied in many different forms.

It will be understood that when an element or layer is referred to as being "on" or "above" another element or layer, the element or layer may be directly on another element or layer or intervening elements or layers. Singular forms are intended to include the plural forms as well, unless the context clearly indicates otherwise. It should be understood that, when a part "comprises" or "includes" an element in the specification, unless otherwise defined, it is not excluding other elements but may further include other elements.

In the specification, the term "above" and similar directional terms may be applied to both singular and plural. With respect to operations that constitute a method, the operations may be performed in any appropriate sequence unless the sequence of operations is clearly described or unless the context clearly indicates otherwise. The operations may not necessarily be performed in the order of sequence.

Also, in the specification, the term "units" or " . . . modules" denote units or modules that process at least one function or operation, and may be realized by hardware, software, or a combination of hardware and software.

Connections or connection members of lines between components shown in the drawings illustrate functional connections and/or physical or circuit connections, and the connections or connection members can be represented by replaceable or additional various functional connections, physical connections, or circuit connections in an actual apparatus.

The use of any and all examples, or exemplary language provided herein, is intended merely to better illuminate the inventive concept and does not limit the scope of the inventive concept unless otherwise claimed.

FIG. 1 is a schematic block diagram showing a configuration of a LiDAR apparatus 100 according to an example embodiment. Referring to FIG. 1, the LiDAR apparatus 100 according to an example embodiment may include a light source 110 configured to generate light having a predetermined wavelength, an optical transmitter 120 configured to emit light generated by the light source 110 to the outside, an optical receiver 130 configured to receive light from the outside, a resonance-type photodetector 140 configured to selectively amplify and detect light having the same wavelength as that of light generated by the light source 110 among the light received by the optical receiver 130, and a processor 150 configured to control the operation of the light source 110 and the resonance-type photodetector 140.

The light source 110 may be configured to emit pulsed light at regular time intervals under the control of the processor 150. In addition, the light source 110 may be configured to emit light in an infrared band that is not visible to the human eye. For example, the light source 110 may be configured to emit light having some wavelength bands selected from about 800 nm to about 2,000 nm. The light source 110 may be, for example, a pulsed laser light source, but is not limited thereto. A light-emitting diode (LED) may be used as the light source 110 if the emission wavelength may be controlled within a tolerance range.

The optical transmitter 120 may be configured to transmit light generated by the light source 110 by directing the light in a specific direction according to the control of the processor 150. The optical transmitter 120 may be a beam steering device that sequentially radiates light to a plurality of areas. Hereinafter, light emitted by the optical transmitter 120 to the outside is referred to as signal light. For example, the optical transmitter 120 may perform a two-dimensional (2D) scan in a manner that signal light is radiated to the plurality of front areas while sequentially changing an azimuth direction at a selected elevation angle, then, the altitude angle is changed, and afterwards, the signal light is radiated while sequentially changing again the azimuth direction.

The optical transmitter 120 may be implemented, for example, in an optical phased array (OPA) method, but embodiments are not limited thereto. For example, the optical transmitter 120 may include an actuator configured to rotate the light source 110. In this case, the optical transmitter 120 may rotate the light source 110 to control a radiation direction of the signal light. In another example, the optical transmitter 120 may include a mirror that reflects light generated by the light source 110 and an actuator that rotates the mirror, or a micro-electro mechanical system (MEMS) that electromechanically controls a reflection direction of light generated by the light source 110.

The optical receiver 130 receives light reflected from an object OBJ. The optical receiver 130 may receive all light coming toward the LiDAR apparatus 100 from the outside, but may be particularly configured to receive light coming from a direction in which the optical transmitter 120 transmits signal light. For example, the optical receiver 130 may be implemented in an optical phased array method. In another example, the optical receiver 130 may be implemented as a lens array in which a plurality of micro lenses are two-dimensionally arranged. When the optical receiver 130 is implemented as a lens array, the optical receiver 130 may further include an actuator that controls the direction of the lens array according to the control of the processor 150.

In addition, the LiDAR apparatus 100 may further include an optical system 160 configured to radiate the signal light emitted by the optical transmitter 120 to the outside, if necessary. The optical system 160 may focus the signal light such that the beam diameter of the signal light emitted by the optical transmitter 120 does not increase as a distance away from the optical transmitter 120 increases. In addition, the optical system 160 may focus light coming from the outside onto the optical receiver 130. However, the optical system 160 may be omitted when the signal light whose a beam diameter is sufficiently controlled is emitted by the optical transmitter 120.

In addition, the LiDAR apparatus 100 may further include a band-pass filter 161 configured to selectively transmit only light of a specific wavelength band among light coming toward the LiDAR apparatus 100 from the outside. The band-pass filter 161 may be disposed to face a light receiving surface of the optical receiver 130 to limit a wavelength band of light incident on the optical receiver 130. A pass band of the band-pass filter 161 may match a wavelength band of the signal light. For example, when the light source 110 emits light having a wavelength band selected from about 800 nm to about 2,000 nm band, the pass band of the band-pass filter 161 may be selected within about 800 nm to about 2,000 nm.

The processor 150 may control the operation of the light source 110, the optical transmitter 120, and the optical receiver 130, and extracts distance information or speed information about an external object (OBJ), for example, in the time of flight (TOF) method based on the received signal received from the resonance-type photodetector 140. The processor 150 may be implemented as, for example, a dedicated semiconductor chip, or as software that may be executed in a computer and stored in a non-transitory computer-readable recording medium. According to another example, the processor 150 may be implemented as a programmable logic controller (PLC) ora field-programmable gate array (FPGA). In addition, the processor 150 may be mounted on a substrate together with the light source 110, the optical transmitter 120, the optical receiver 130, and the resonance-type photodetector 140, or may be mounted on a separate substrate.

The resonance-type photodetector 140 may improve a signal-to-noise ratio of the LiDAR apparatus 100 by selectively amplifying and detecting light having the same wavelength as that of the signal light among light received by the optical receiver 130. Even if the band-pass filter 161 is used, considering the wavelength change of the light source 110, a pass bandwidth of the band-pass filter 161 may be selected to be about several tens of nm. Accordingly, even if the band-pass filter 161 is used, external noise, such as sunlight, streetlights, headlights of other vehicles, etc. may be incident on the resonance-type photodetector 140 through the optical receiver 130. The resonance-type photodetector 140 may select and detect only light having the same wavelength as the signal light from among the light received by the optical receiver 130.

The resonance-type photodetector 140 may include a resonator 141, a phase modulator 142 disposed on the resonator 141 configured to control the phase of light traveling along the resonator 141 based on the control of the processor 150, and an optical detector 143 that may detect the intensity of light traveling along the resonator 141.

The resonator 141 may be, for example, a closed curve waveguide resonator. In FIG. 1, the resonator 141 has a circular shape, but the shape of the resonator 141 is not limited thereto, and may have any other shape, such as, for example, an ellipse or a polygon as long as the resonator 141 has a closed curve structure. The resonance wavelength of the resonator 141 may be determined by an optical length of a closed curve waveguide. The optical length of the closed curve waveguide may be expressed as a product of a physical length of the closed curve waveguide and an average refractive index of the closed curve waveguide.

A wavelength of light generated by the light source 110 may be changed as necessary based on the control of the processor 150, or may be changed by external environmental variables, such as temperature. The phase modulator 142 may match a resonance wavelength of the resonator 141 with a wavelength of light generated by the light source 110 based on the control of the processor 150. For example, when a phase of light traveling along the resonator 141 is changed, an effect of changing an optical length of the closed curve waveguide occurs, and thus, the resonance wavelength of the resonator 141 is changed. When a phase delay of light increases, an optical length of a closed curve waveguide increases, and thus, the resonance wavelength of the resonator 141 increases. However, when the phase delay of light decreases, the optical length of the closed curve waveguide decreases, and thus, the resonance wavelength of the resonator 141 decreases. Accordingly, the phase modulator 142 may control the resonance wavelength of the resonator 141 by controlling the phase of light traveling along the resonator 141 by being disposed on the resonator 141.

The phase modulator 142 may change the temperature of a waveguide or change the concentration of carriers, for example, electrons or holes. For example, in the temperature change method, the phase of light may be controlled by changing the temperature around a waveguide to change a refractive index of the waveguide. In addition, in the carrier concentration change method, the phase of light may be controlled by placing a diode junction around the center of a waveguide to change the refractive index of the waveguide through the carrier concentration change.

The optical detector 143 may detect the intensity of light traveling along the resonator 141. When the optical detector 143 absorbs all of light traveling along the resonator 141, no resonance occurs in the resonator 141, and thus, the optical detector 143 may absorb and detect only a part of the light traveling along the resonator 141, and pass the rest of the light to the resonator 141 to travel along the resonator 141. The intensity of light detected by the optical detector 143 may be the intensity of light corresponding to a resonance wavelength of the resonator 141. Accordingly, the optical detector 143 measures the intensity of light having the same wavelength as the wavelength of light generated by the light source 110.

Also, the LiDAR apparatus 100 may further include a first waveguide 102 between the light source 110 and the optical transmitter 120, a second waveguide 103 between the light source 110 and the resonator 141, a third waveguide 104 between the optical receiver 130 and the resonator 141, and an optical switch 101 configured to provide light generated by the light source 110 to the first waveguide 102 or the second waveguide 103 according to the control of the processor 150.

The optical switch 101, the first waveguide 102, the second waveguide 103, and the third waveguide 104 may be mounted on the same substrate together with the resonance type photodetector 140, the optical transmitter 120, and the optical receiver 130, but are not limited thereto. For example, the first waveguide 102, the second waveguide 103, and the third waveguide 104 may each include an optical fiber, and the optical switch 101, the resonance-type photodetector 140, and the optical transmitter 120, and the optical receiver 130 may be individually fixed inside a case of the LiDAR apparatus 100.

The optical switch 101 may be an element in which an optical path is changed according to an electrical signal. For example, the optical switch 101 may be implemented in various ways, such as a Mach-Zehnder interferometer switch, a thermal heater, or a combination thereof.

A first end of the first waveguide 102 is connected to the optical switch 101, and a second end opposite to the first end may be connected to an input port of the optical transmitter 120. When the optical switch 101 provides light generated by the light source 110 to the first waveguide 102 according to the control of the processor 150, the light generated by the light source 110 is transmitted to the optical transmitter 120 along the first waveguide 102.

Also, a first end of the second waveguide 103 is connected to the optical switch 101, and a portion of the second waveguide 103 including a second end opposite to the first end is disposed adjacent to the resonator 141. A portion of the second waveguide 103 is disposed in a direction parallel to the tangential direction of the resonator 141, but is not in physical contact with the resonator 141. For example, the shortest distance between the resonator 141 and the second waveguide 103 may be greater than 0 and less than 5 times a width of the second waveguide 103. Also, the shortest distance between the resonator 141 and the second waveguide 103 may be less than twice the width of the second waveguide 103, for example, 0.5 times to 1 times the width of the second waveguide 103. Then, light traveling along the second waveguide 103 toward the second end of the second waveguide 103 may be transmitted to the resonator 141 without affecting the resonance wavelength of the resonator 141 by the second waveguide 103. When the optical switch 101 provides light generated by the light source 110 to the second waveguide 103 according to the control of the processor 150, the light generated by the light source 110 is supplied to the resonator 141 along the second waveguide 103.

A first end of the third waveguide 104 is connected to the optical receiver 130, and a portion of the third waveguide 104 including a second end opposite to the first end is adjacent to the resonator 141. A portion of the third waveguide 104 is disposed in a direction parallel to the tangential direction of the resonator 141, but is not in physical contact with the resonator 141. For example, the shortest distance between the resonator 141 and the third waveguide 104 may be greater than 0 and less than 5 times a width of the third waveguide 104. Also, the shortest distance between the resonator 141 and the third waveguide 104 may be less than twice the width of the third waveguide 104, for example, 0.5 times to 1 times the width of the third waveguide 104. Then, the third waveguide 104 may not affect the resonance wavelength of the resonator 141, and light incident on the first end of the third waveguide 104 from the optical receiver 130 may be transmitted to the resonator 141 in a process of traveling toward the second end along the third waveguide 104. The third waveguide 104 may be disposed on an opposite side of the second waveguide 103 with the resonator 141 therebetween, but is not limited thereto.

In the LiDAR apparatus 100 having the structure described above, before providing light generated by the light source 110 to the optical transmitter 120 to emit to the outside through the optical transmitter 120, the light is first provided to the resonator 141 to match the resonance wavelength of the resonator 141 with the wavelength of the light generated by the light source 110. Thereafter, the light is emitted to the outside by supplying the light to the optical transmitter 120, and among the light received from the optical receiver 130, only signal light corresponding to the resonance wavelength of the resonator 141 may be selectively amplified and detected. For example, FIGS. 2A and 2B are schematic block diagrams illustrating an operation of the LiDAR apparatus 100 of FIG. 1.

Figure 2A:
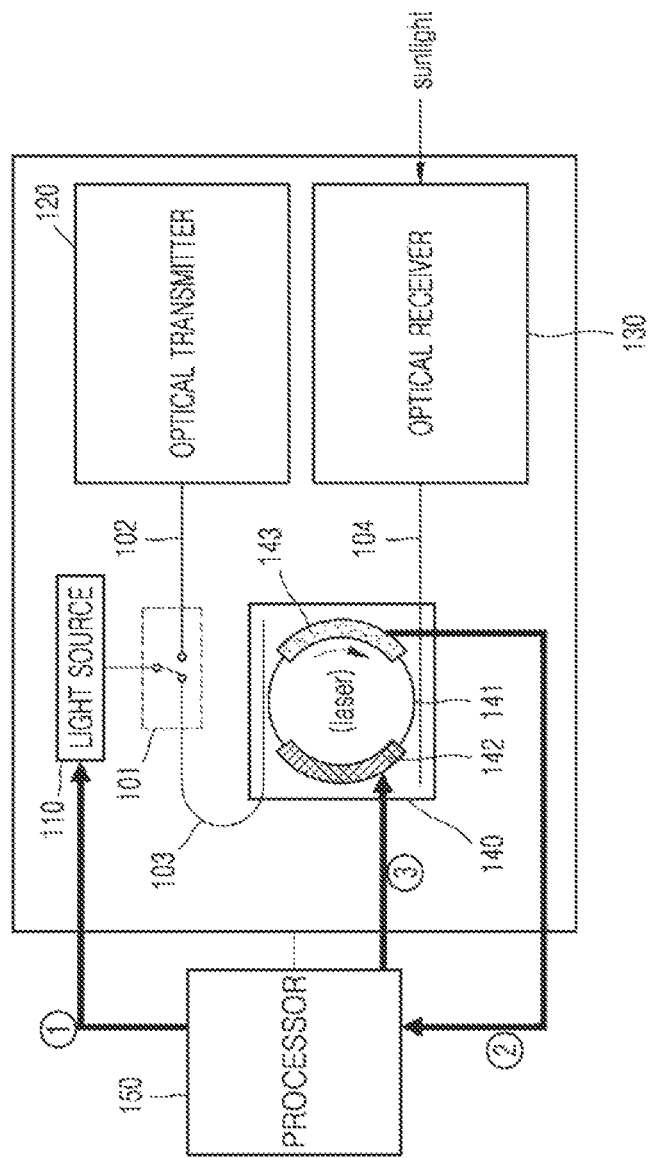
FIGS. 2A and 2B are schematic block diagrams illustrating an operation of the LiDAR apparatus of FIG. 1.
Figure 2B:
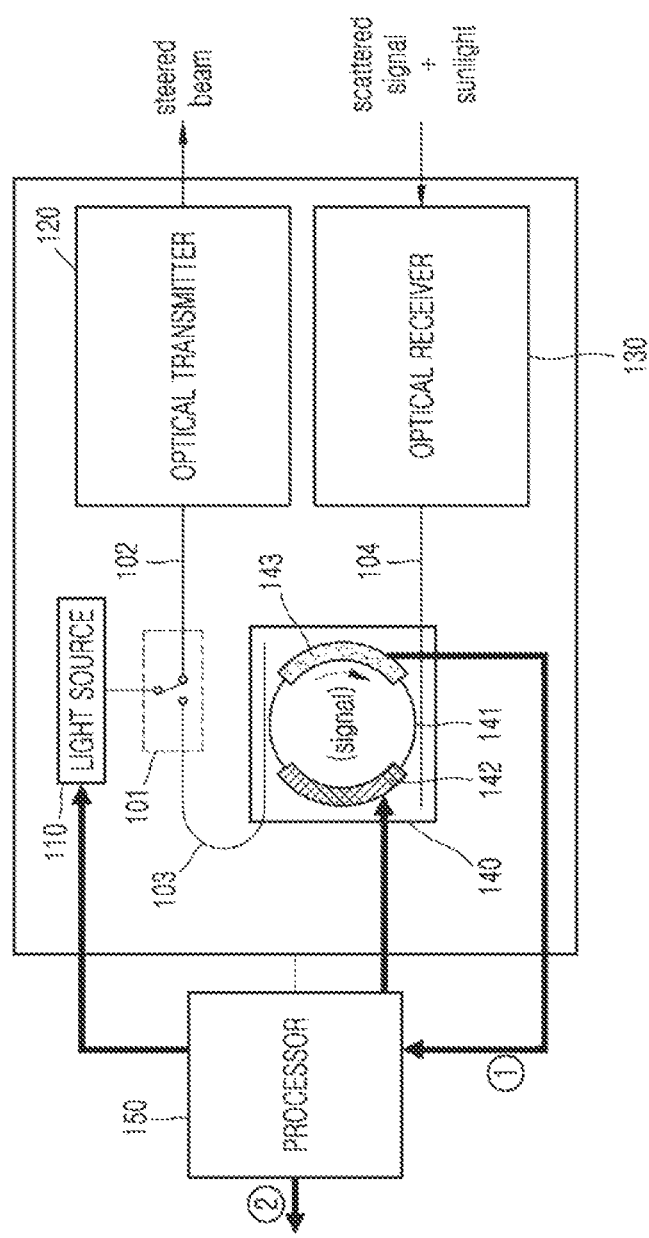

First, FIG. 2A shows a process of tuning the resonance wavelength of the resonator 141 to match the wavelength of light generated by the light source 110. Referring to FIG. 2A, the processor 150 may control the optical switch 101 to optically connect the light source 110 to the second waveguide 103. Then, the processor 150 turns on the light source 110 to generate light. At this point, the processor 150 may control the light source 110 to control the wavelength of light generated by the light source 110. Light generated by the light source 110 may be transmitted to the resonator 141 via the second waveguide 103 and resonates in the resonator 141. The processor 150 may control the phase modulator 142 by monitoring an output of the optical detector 143 to gradually change the phase of the light traveling along the resonator 141. The process of controlling the phase delay by the phase modulator 142 may be repeated until the output of the optical detector 143 is maximized.

While controlling a phase of light traveling along the resonator 141 by controlling the phase modulator 142, when the intensity of light detected by the optical detector 143 reaches the maximum, the processor 150 may determine that the resonance wavelength of the resonator 141 matches the wavelength of the light generated by the light source 110. In this manner, after determining the resonance wavelength of the resonator 141, the processor 150 may terminate the tuning mode shown in FIG. 2A, and the wavelength of the light source 110 determined in the tuning mode and the phase delay by the phase modulator 142 may be fixed to be constant. If necessary, the processor 150 may store the control condition determined in the tuning mode in a memory.

Afterwards, the processor 150 performs a signal detection mode. For example, as shown in FIG. 2B, the processor 150 may control the optical switch 101 to optically connect the light source 110 to the first waveguide 102. Then, light generated by the light source 110 may be transmitted to the optical transmitter 120 through the first waveguide 102. The processor 150 may control the optical transmitter 120 to sequentially or irregularly radiate light to a plurality of areas. In a signal detection mode, the processor 150 may maintain a wavelength of the light source 110 determined in the tuning mode and a phase delay by the phase modulator 142.

Light incident on the optical receiver 130 from the outside may travel along the third waveguide 104. Among light traveling along the third waveguide 104, only light having a wavelength that satisfies the resonance condition of the resonator 141 may resonate in the resonator 141 and may be detected by the optical detector 143. Light having a wavelength that satisfies the resonance condition of the resonator 141 may include not only light having a wavelength exactly matching the wavelength of the signal light, but also light having a plurality of wavelengths corresponding to an integer multiple of an optical length of a closed curve waveguide of the resonator 141.

Figure 3:
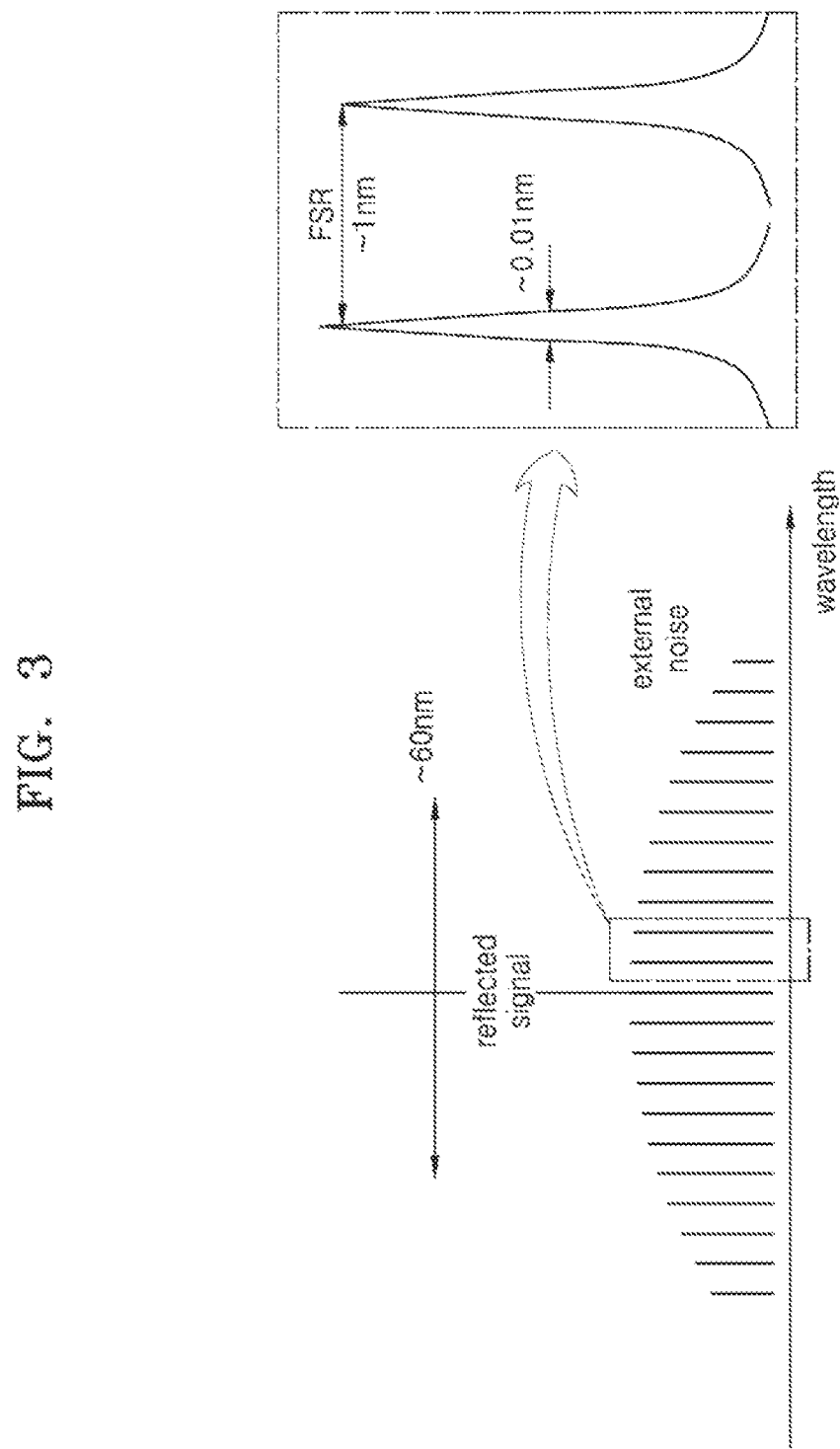
FIG. 3 is a graph showing a distribution of signals detected by the LiDAR apparatus of FIG. 1.

For example, FIG. 3 is a graph showing a distribution of signals detected by the LiDAR apparatus 100 of FIG. 1. Referring to FIG. 3, external noise entering through the optical receiver 130 together with signal light is distributed over a wide wavelength band of at least several tens of nm or more. Most of the pieces of external noise are components that do not exactly match the resonance wavelength of the resonator 141. Accordingly, a signal light component entering the resonator 141 is amplified in the closed curve waveguide, and the noise component exits to the second end of the third waveguide 104 and disappears by scattering in a circuit board on which the third waveguide 104 is mounted or a chip including the third waveguide 104.

Among the pieces of external noise, only components that match the resonance wavelength of the resonator 141 are detected by the optical detector 143 together with signal light. For example, in FIG. 3, a plurality of peaks corresponding to the resonance wavelength of the resonator 141 are illustrated as an example. As shown in the graph of FIG. 3, noise having a width of about 0.01 nm based on a full width at half maximum may be detected by the optical detector 143 about every 1 nm period. Accordingly, assuming that external noise entering through the optical receiver 130 together with signal light includes light of uniform intensity in all wavelength bands, only about $\frac{1}{100}$ of the external noise may be detected by the optical detector 143, and due to the reduced noise, the signal-to-noise ratio of the LiDAR apparatus 100 may be improved. Because the period and width of the peaks shown in FIG. 3 may be determined by various design factors, such as a length of the closed curve waveguide of the resonator 141, a loss of light in the resonator 141, an interval with the third waveguide 104, etc. the figures illustrated above are only examples.

The intensity of light incident on the optical detector 143 optically connected to the resonator 141 is amplified by several tens of times than actual intensity of light incident on the optical receiver 130 due to the resonance phenomenon in the resonator 141. Accordingly, the same effect as the sensitivity of the optical detector 143 is increased may be achieved. Due to this effect, the signal-to-noise ratio of the LiDAR apparatus 100 may be improved. Therefore, even if the band-pass filter 161 shown in FIG. 1 is omitted, a high signal-to-noise ratio may be achieved.

As described above, the optical detector 143 may not absorb all of light traveling along the resonator 141, but may absorb and detect only a portion of the light. The conditions allow the use of a silicon optical detector. An ideal silicon crystal absorbs visible light, but does not absorb light in an infrared wavelength range. However, infrared absorption by two-photon absorption due to lattice defects in and on a silicon surface may be observed. The generation of photocurrent by the two-photon absorption mechanism may be generally about 5 mA/W, which is very weak. However, in the case of the LiDAR apparatus 100 according to the example embodiment, a responsiveness of about 0.1 NW may be obtained by coupling a silicon detector to the resonator 141. This is similar responsiveness to that of an optical detector using germanium (Ge) ora Group III-V compound semiconductor with respect to an infrared wavelength range.

Accordingly, a silicon detector as the optical detector 143 for detecting a signal in the infrared wavelength range may be used. When a silicon detector is used, only a part of light may be absorbed to the extent that a resonance phenomenon in the resonator 141 may be maintained. In addition, by being coupled to the resonator 141, the silicon detector may achieve similar performance to an infrared detector that uses other semiconductor materials. When a silicon detector is used as the optical detector 143, the optical transmitter 120, the optical receiver 130, and the resonance-type photodetector 140 shown in FIG. 1 may be implemented by using the current complementary metal oxide semiconductor (CMOS)

manufacturing process, and thus, the production cost of the LiDAR apparatus 100 may be greatly reduced.

Figure 4:
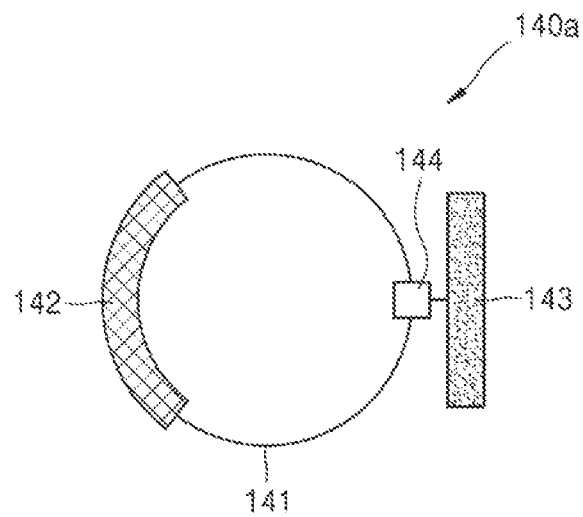
FIG. 4 is a schematic diagram showing another configuration of a resonance-type photodetector of the LiDAR apparatus of FIG. 1.

In FIG. 1, it is depicted that the optical detector 143 is disposed on a closed curve waveguide of the resonator 141, but is not limited thereto. For example, FIG. 4 shows another configuration of a resonance-type photodetector 140a of the LiDAR apparatus 100 of FIG. 1 according to an example embodiment. Referring to FIG. 4, the resonance-type photodetector 140a may include an optical coupler 144 disposed on a closed curve waveguide of the resonator 141 and an optical detector 143 connected to the optical coupler 144. The optical coupler 144 may provide a part of light traveling in the resonator 141 to the optical detector 143.

Figure 5:
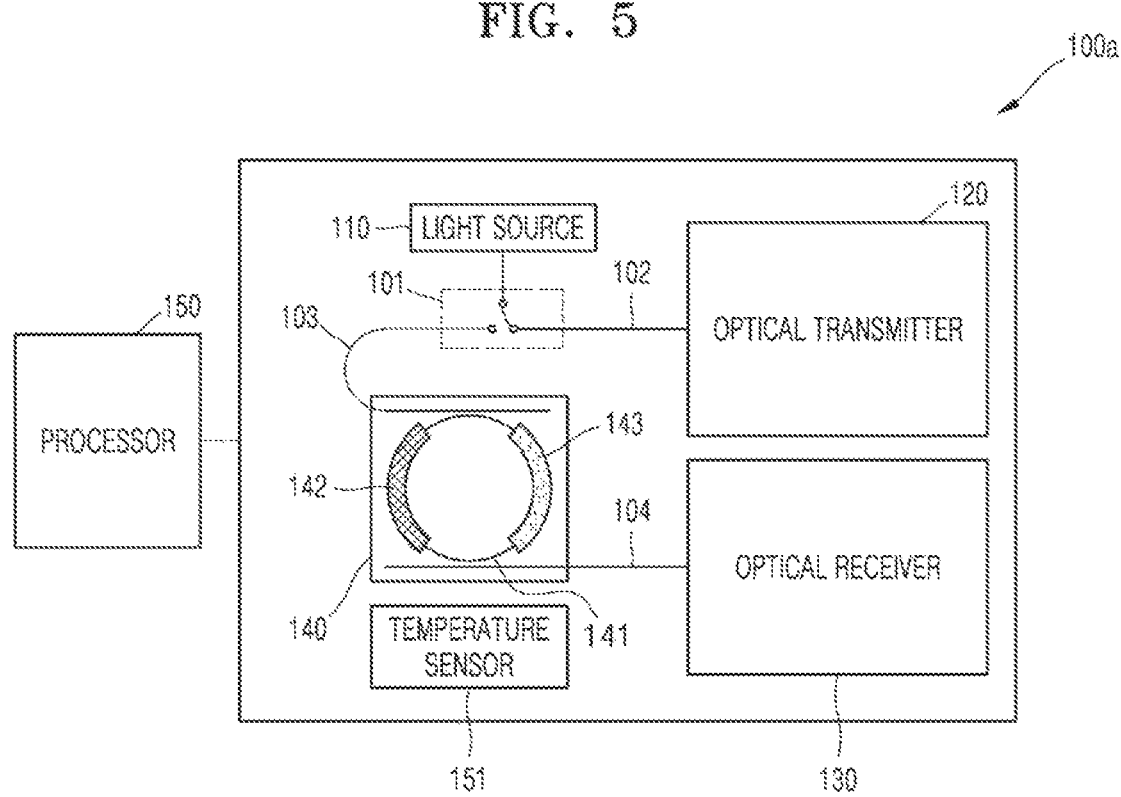
FIG. 5 is a schematic block diagram showing a configuration of a LiDAR apparatus according to another example embodiment.

FIG. 5 is a schematic block diagram showing a configuration of a LiDAR apparatus 100a according to another example embodiment. Referring to FIG. 5, the LiDAR apparatus 100a may further include a temperature sensor 151. The temperature sensor 151 may be arranged to measure an ambient temperature around the LiDAR apparatus 100a, particularly the temperature of the light source 110. The wavelength of light generated by the light source 110 may be generally greatly influenced by temperature. The processor 150 may include a memory configured to store a relationship between the temperature of the light source 110 and the wavelength of light.

The processor 150 may store a temperature measured by the temperature sensor 151 in a memory while performing the tuning mode illustrated in FIG. 2A. Also, while performing the signal detection mode shown in FIG. 2B, the processor 150 may monitor the temperature of the light source 110 measured by the temperature sensor 151. If the temperature measured by the temperature sensor 151 during the signal detection mode is significantly different from the temperature stored in the memory, the processor 150 may temporarily stop the signal detection mode and perform the tuning mode again. For example, compared with a wavelength of light generated by the light source 110 calculated based on a temperature measured during a tuning mode, if a wavelength of light generated by the light source 110, calculated based on the temperature measured during a signal detection mode does not sufficiently satisfy a resonance condition of the resonator 141, the processor 150 may stop the signal detection mode and perform the tuning mode. For example, if the wavelength of light generated by the light source 110 changes by about 1 nm or more, the processor 150 may perform the tuning mode again. In this manner, the processor 150 may match the resonance wavelength of the resonator 141 with the changed wavelength of light generated by the light source 110 in real time.

Figure 6:
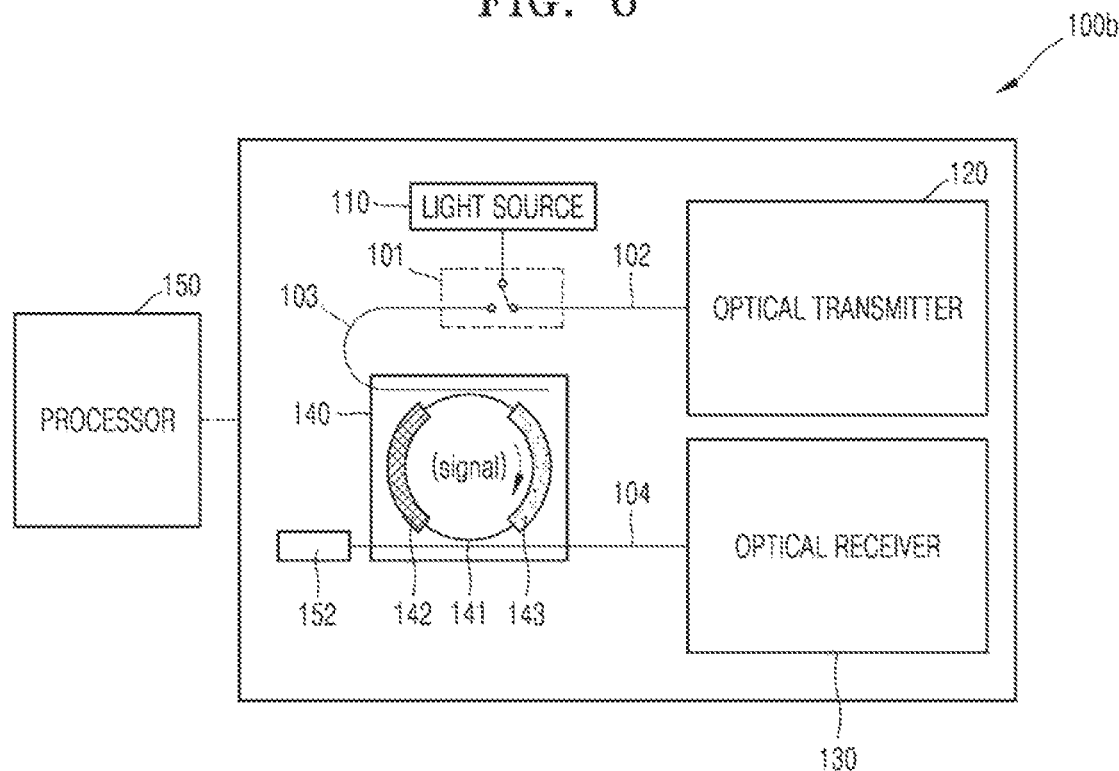
FIG. 6 is a schematic block diagram showing a configuration of a LiDAR apparatus according to another example embodiment.

FIG. 6 is a schematic block diagram showing a configuration of a LiDAR apparatus 100b according to another example embodiment. Referring to FIG. 6, the LiDAR apparatus 100b may further additionally include an optical detector 152 at the second end of the third waveguide 104. As described above, among light received through the optical receiver 130, a signal light component is amplified in the resonator 141 and a noise component travels toward the second end of the third waveguide 104. Accordingly, the optical detector 152 disposed at the second end of the third waveguide 104 may measure the intensity of external noise. The wavelength distribution of external noise may vary according to external conditions, for example, daytime, nighttime, tunnel, weather, etc. The processor 150 may predict an external state based on a wavelength distribution of external noise provided from the optical detector 152 and provide external information to a user.

Figure 7:
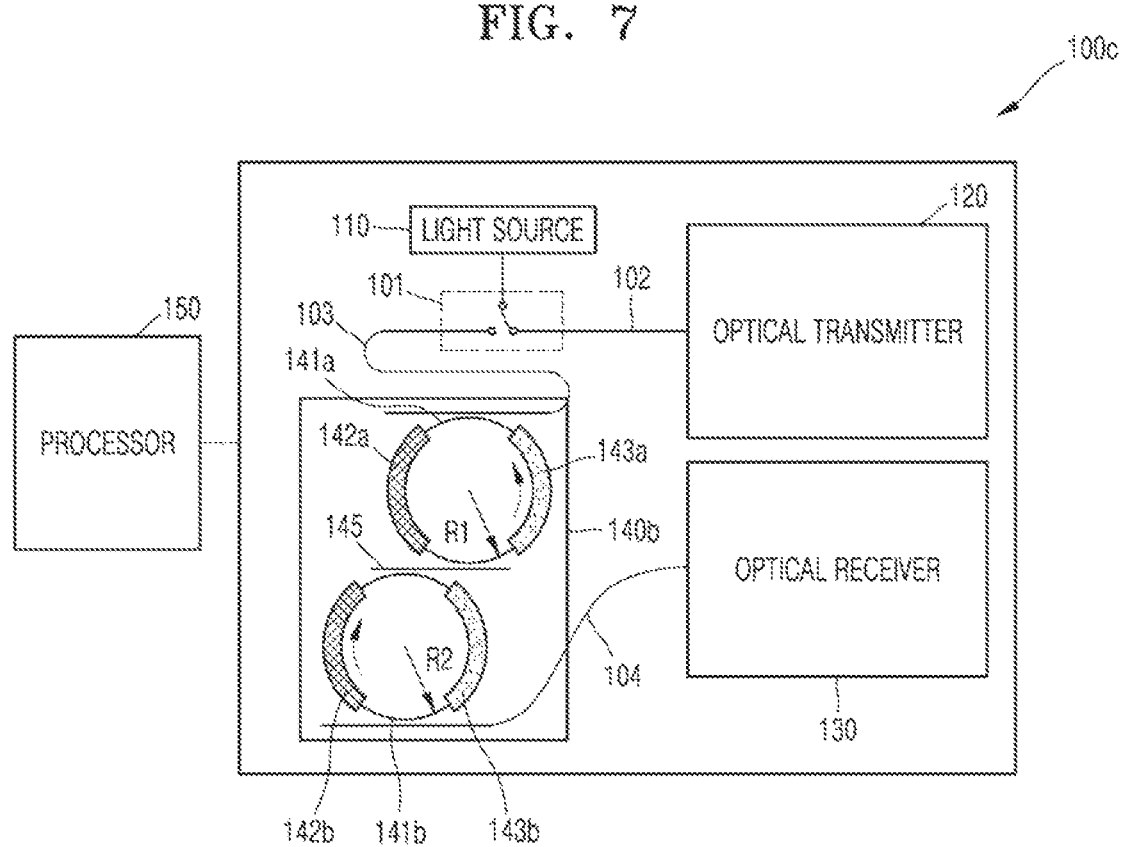
FIG. 7 is a schematic block diagram showing a configuration of a LiDAR apparatus according to another example embodiment.

FIG. 7 is a schematic block diagram showing a configuration of a LiDAR apparatus 100c according to another example embodiment. Referring to FIG. 7, the LiDAR apparatus 100c may include a resonance-type photodetector 140b including at least two resonators having different optical path lengths and optically connected to each other. For example, the resonance-type photodetector 140b may include a first resonator 141a having a first optical path length, a first phase modulator 142a that is disposed on the first resonator 141a to control a phase of light travelling along the first resonator 141a, a first optical detector 143a that detects the intensity of light traveling along the first resonator 141a, a second resonator 141b having a second optical path length different from the first optical path length, a second phase modulator 142b disposed on the second resonator 141b to control the phase of light traveling along the second resonator 141b, and a second photodetector 143b to detect the intensity of light traveling along the second resonator 141b.

The first resonator 141a and the second resonator 141b may be, for example, closed curve waveguide resonators. In FIG. 7, as an example, it is depicted that the first resonator 141a is a circular closed curve waveguide having a first diameter R1 and the second resonator 141b is a circular closed curve waveguide having a second diameter R2 that is different from the first diameter R1, but the closed curve waveguides of the first resonator 141a and the second resonator 141b are not necessarily circular, and closed curve waveguides having various shapes with different optical path lengths may be used. Also, the closed curve waveguide of the first resonator 141a and the closed curve waveguide of the second resonator 141b may have different shapes from each other.

The second waveguide 103 optically connected to the optical switch 101 is arranged to transmit light generated by the light source 110 to the first resonator 141a. The third waveguide 104 optically connected to the optical receiver 130 is arranged to transmit light that has entered the optical receiver 130 to the second resonator 141b. For example, the second waveguide 103 is disposed in a direction parallel to a tangential direction of the first resonator 141a in the vicinity of the first resonator 141a, and the third waveguide 104 may be disposed in a direction parallel to a tangential direction of the second resonator 141b in the vicinity of the second resonator 141b.

The first resonator 141a and the second resonator 141b may be optically connected to each other. For example, the resonance-type photodetector 140b may further include a fourth waveguide 145 connected between the first resonator 141a and the second resonator 141b. Light traveling along the first resonator 141a may be transmitted to the second resonator 141b through the fourth waveguide 145, and also, light traveling along the second resonator 141b may be transmitted to the first resonator 141a through the fourth waveguide 145. Therefore, light supplied to the first resonator 141a through the second waveguide 102 and light supplied to the second resonator 141b through the third waveguide 104 may travel in the form of an 8 shape along the first resonator 141a and the second resonator 141b.

When the optical path length of the closed curve waveguide is changed, the resonance wavelength of a resonator is changed, and an interval between the resonance wavelengths, that is, the resonance period is also changed. When two closed curve waveguides are connected in series, a signal may be detected only when the resonance conditions of the two closed curve waveguides are satisfied. Accordingly, external noise detected together with a signal is limited to a wavelength in which the resonance conditions of the two closed curve waveguides are simultaneously satisfied, and as a result, the effect of increasing a resonance period may be obtained.

Figure 8:
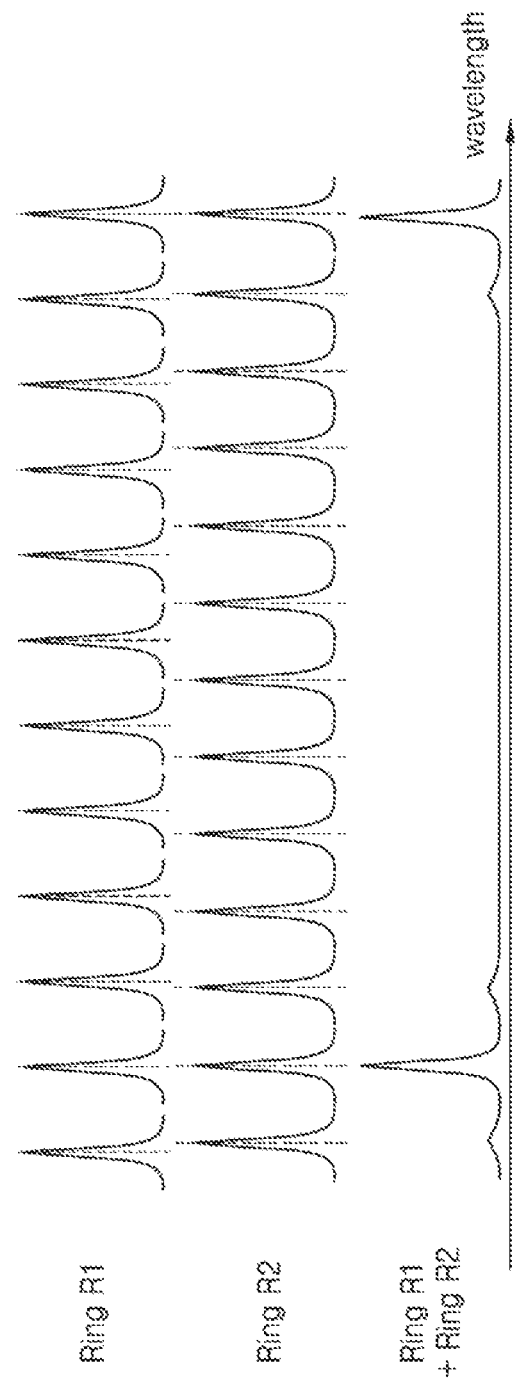
FIG. 8 is a diagram showing example resonance characteristics of each of first and second resonators and the resonance-type photodetector in the LiDAR apparatus of FIG. 7.

For example, FIG. 8 is a diagram showing example resonance characteristics of each of the first and second resonators 141a and 141b and resultant resonance characteristics of the resonance-type photodetector 140b in the LiDAR apparatus 100c of FIG. 7. The resonance period of a resonator is proportional to the reciprocal of the optical path length, and as the optical path length increases, the resonance period decreases. In FIG. 8, it is assumed that the first resonator 141a and the second resonator 141b are circular closed curve waveguides having diameters R1 and R2, respectively. Referring to FIG. 8, the resonance period of each of the first and second resonators 141a and 141b is relatively short, but the resultant resonance period of the resonance-type photodetector 140b in which the first resonator 141a and the second resonator 141b are connected in series is significantly increased. For example, the resultant resonance period of the resonance-type photodetector 140b may be equal to the least common multiple of the resonance period of the first resonator 141a and the resonance period of the second resonator 141b. Accordingly, external noise detected by the first optical detector 143a and the second optical detector 143b may further be reduced.

When two resonators are used, the tuning mode may be sequentially performed one by one. For example, the processor 150 first controls a phase delay by the first phase modulator 142a until the intensity of light measured by the first optical detector 143a is maximized. In this manner, the resonance wavelength of the first resonator 141a may be matched with the wavelength of light generated by the light source 110. When the intensity of light measured by the first optical detector 143a is maximized, the processor 150 then controls a phase delay by the second phase modulator 142b until the intensity of light measured by the second optical detector 143b is maximized. In this manner, the resonance wavelength of the second resonator 141b is matched with the wavelength of light generated by the light source 110.

After determining the resonance wavelengths of the first and second resonators 141a and 141b, the processor 150 provides light generated by the light source 110 to the optical transmitter 120 to perform a signal detection mode. In the signal detection mode, the processor 150 may calculate information with respect to an external object using both a signal detected by the first optical detector 143a and a signal detected by the second optical detector 143b. The use of two photodetectors may improve the accuracy and precision in the tuning mode and signal detection mode.

Figure 9:
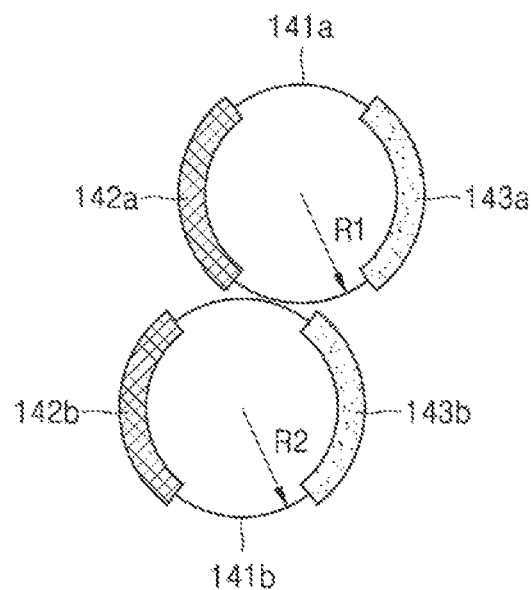
FIG. 9 is a schematic diagram showing another configuration of the resonance-type photodetector of the LiDAR apparatus of FIG. 7.

In FIG. 7, it is depicted that the first resonator 141a and the second resonator 141b are connected in series through the fourth waveguide 145, but embodiments are not limited thereto. For example, FIG. 9 shows another configuration of a resonance-type photodetector 140c of the LiDAR apparatus 100c of FIG. 7. Referring to FIG. 9, the resonance-type photodetector 140c may include a first resonator 141a and a second resonator 141b adjacent to each other without a fourth waveguide 145. The first resonator 141a and the second resonator 141b do not physically contact each other, and the shortest distance between the first resonator 141a and the second resonator 141b may be, for example, greater than 0 and less than 5 times a width of a closed curve waveguide. Also, the shortest distance between the first resonator 141a and the second resonator 141b may be less than twice a width of the closed curve waveguide, for example, 0.5 times to 1 times the width of the closed curve waveguide. The rest of the configuration of the resonance-type photodetector 140c may be the same as that of the resonance-type photodetector 140b shown in FIG. 7.

Figure 10:
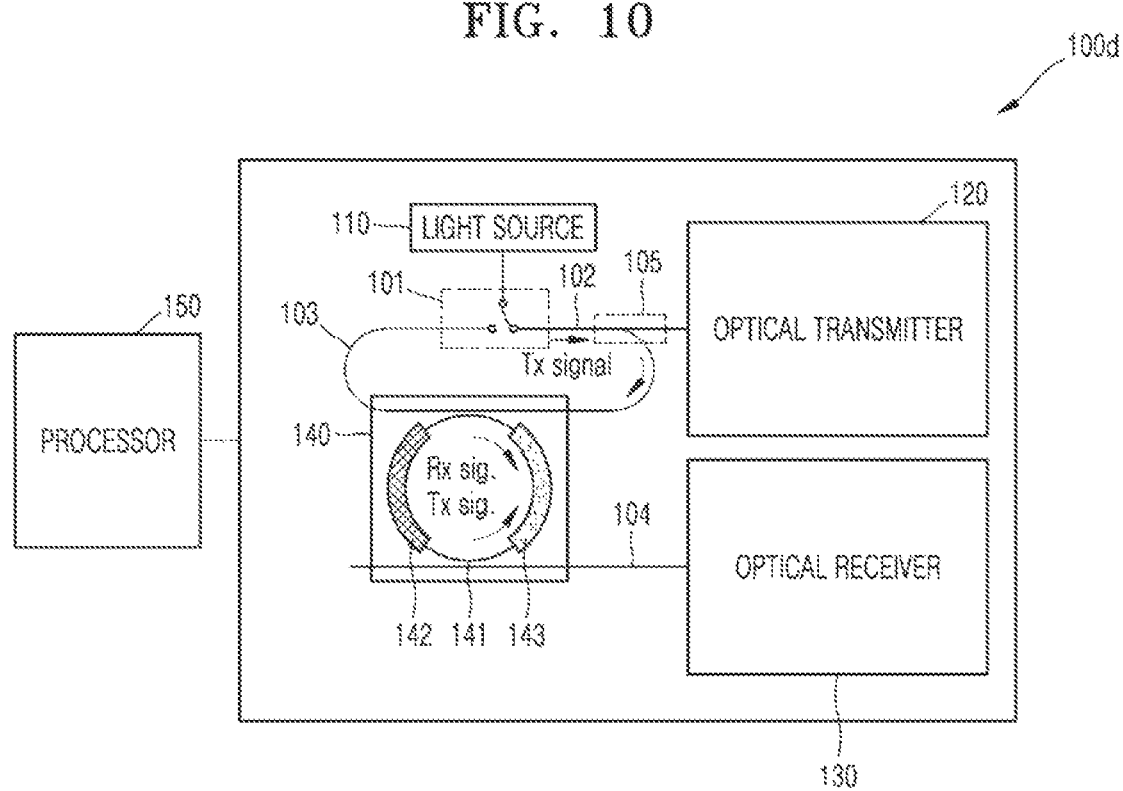
FIG. 10 is a schematic block diagram showing a configuration of a LiDAR apparatus according to another example embodiment.

FIG. 10 is a schematic block diagram showing a configuration of a LiDAR apparatus 100d according to another example embodiment. Referring to FIG. 10, the LiDAR apparatus 100d may further include an optical coupler 105 on the first waveguide 102. Accordingly, the optical coupler 105 may be disposed in the optical path between the optical switch 101 and the optical transmitter 120. Also, a first end of the second waveguide 103 of the LiDAR apparatus 100d may be connected to the optical switch 101 and the second end extends to the optical coupler 105. A portion between the first end and the second end of the second waveguide 103 is adjacent to the resonator 141 and passes in a tangential direction of the resonator 141.

According to the example embodiment, a part of light generated by the light source 110 and provided to the optical transmitter 120 through the first waveguide 102 may be provided to the resonator 141 through the optical coupler 105 and the second waveguide 103. Accordingly, in a signal detection mode, light received through the optical receiver 130 and light generated by the light source 110 together may be provided to the resonator 141. In this case, a signal measured by the optical detector 143 may be a signal of interfering light formed by interference between the reception light received through the optical receiver 130 and the transmission light generated by the light source 110.

Figure 11:
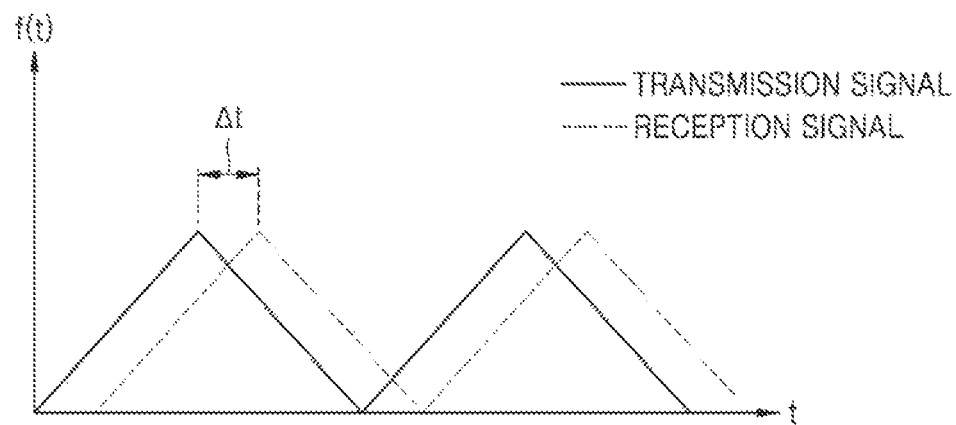
FIG. 11 is a graph showing frequency components of transmission light and frequency components of reception light in a triangular frequency modulated continuous wave (FMCW) method.

Then, the processor 150 may analyze a frequency of a received signal by using a frequency modulated continuous wave (FMCW) method and calculate information about an object. For example, FIG. 11 is a graph showing frequency components of transmission light and frequency components of reception light in a triangular FMCW method. In FIG. 11, the vertical axis represents frequency and the horizontal axis represents time. As shown in FIG. 11, the graph of the transmission light and the reception light shows a triangular shape in which the frequency increases linearly with time and then linearly decreases again. There is a time delay of $\Delta t$ between the frequency peak of the transmission light and the frequency peak of the reception light. According to the FMCW method, using a signal of interfering light measured by the optical detector 143, the processor 150 may calculate the time delay $\Delta t$ between a frequency peak of the transmission light and a frequency peak of the reception light, and through this calculation, distance information of an object and relative speed information with the object may be more accurately calculated. In FIG. 11, although the triangular FMCW method as an example, it is also possible to use a linear FMCW method.

In the example embodiments described above, it has been described that the light source 110 is a pulsed light source and the processor 150 calculates information on an object in front by using a time of flight (TOF) method. However, in order to use the FMCW method in the example embodiment shown in FIG. 10, the light source 110 may be a continuous wave light source that continuously oscillates and generates, for example, continuous light having a waveform like a sine wave. Also, the processor 150 may control the light source 110 such that the light source 110 generates frequency modulated light as illustrated in FIG. 11. Even in the case of using the FMCW method, the wavelength change of the frequency modulated light may be very small, for example, about 0.006 nm. Accordingly, both the minimum wavelength and the maximum wavelength of the frequency modulated light may satisfy the resonance condition of the resonator 141.

Figure 12:
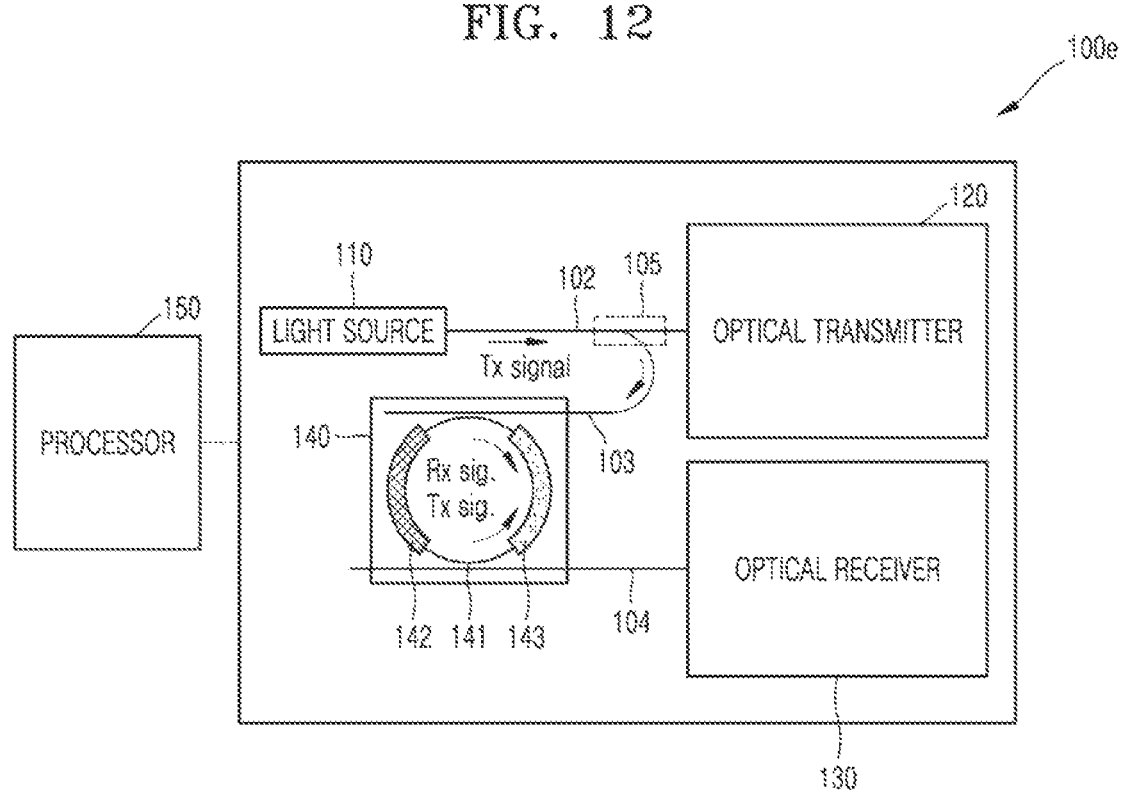
FIG. 12 is a schematic block diagram showing a configuration of a LiDAR apparatus according to another example embodiment.

FIG. 12 is a schematic block diagram showing a configuration of a LiDAR apparatus 100e according to another example embodiment. Referring to FIG. 12, the LiDAR apparatus 100e may not include an optical switch 101, and include a first waveguide 102 between the light source 110 and the optical transmitter 120, an optical coupler 105 on the first waveguide 102, and a second waveguide 103 between the optical coupler 105 and the resonator 141. For example, a first end of the first waveguide 102 may be directly connected to the light source 110 and a second end may be directly connected to the optical transmitter 120. Also, a first end of the second waveguide 103 is connected to the optical coupler 105 and a second end of the second waveguide may passes in the vicinity of the resonator 141 in a direction parallel to a tangential direction of the resonator 141.

In the example embodiment shown in FIG. 12, the processor 150 may not need optical switching when switching between a tuning mode and a signal detection mode. In a tuning mode, a portion of light generated by the light source 110 may be provided to the resonator 141 through the optical coupler 105 and the second waveguide 103. In the tuning mode, the processor 120 may stop the operation of the optical transmitter 120. Also, in a signal detection mode, not only light received through the optical receiver 130 but also light generated by the light source 110 may be provided to the resonator 141. In this case, a signal measured by the optical detector 143 may be a signal of interfering light formed by interference between reception light received through the optical receiver 130 and transmission light generated by the light source 110. The processor 150 may calculate information about an object by analyzing the frequency of the received signal by using the FMCW method.

Figure 13:
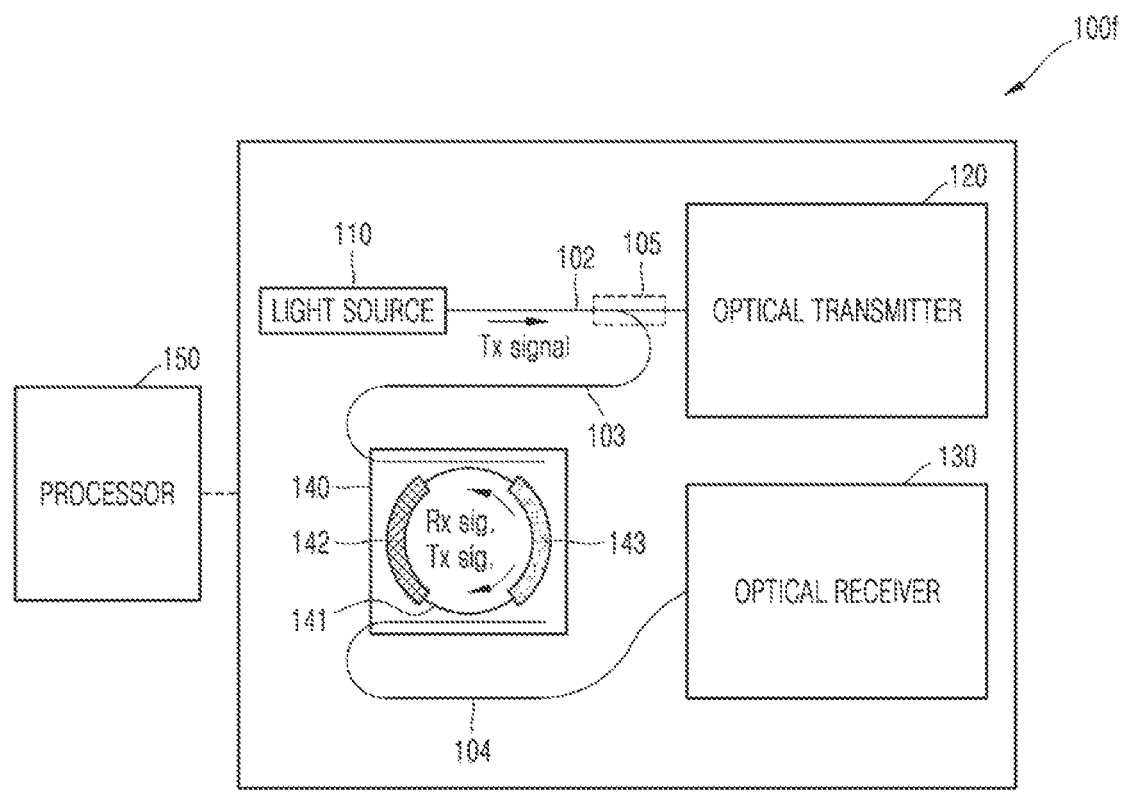
FIG. 13 is a schematic block diagram showing a configuration of a LiDAR apparatus according to another example embodiment.

FIG. 13 is a schematic block diagram showing a configuration of a LiDAR apparatus 100f according to another example embodiment. The configuration of the LiDAR apparatus 100f illustrated in FIG. 13 may be similar to the configuration of the LiDAR apparatus 100e illustrated in FIG. 12 except that the travelling direction of light within the resonator 141 is different. For example, in the case of the LiDAR apparatus 100e shown in FIG. 12, transmission light travels in a counterclockwise direction and reception light travels in a clockwise direction within the resonator 141. In the case of the LiDAR apparatus 100f of FIG. 13, the transmission light travels in a clockwise direction in the resonator 141 and the reception light travels in a counterclockwise direction. To this end, in the LiDAR apparatus 100f of FIG. 13, the second waveguide 103 passes through the vicinity of the resonator 141 in a direction parallel to the tangential direction of the resonator 141 after bending 180 degrees. Also, the third waveguide 104 passes in the vicinity of the resonator 141 in a direction parallel to the tangential direction of the resonator 141 after bending 180 degrees.

Although, in FIG. 13, it is depicted that both the second waveguide 103 and the third waveguide 104 are bent 180 degrees, embodiments are not limited thereto. For example, only the second waveguide 103 may be bent 180 degrees, or only the third waveguide 104 may be bent 180 degrees. When only one of the second waveguide 103 and the third waveguide 104 is bent 180 degrees, the transmission light and the reception light may travel in the same direction within the resonator 141. Even if the transmission light and the reception light travel in the same direction in the resonator 141, an interference signal between the transmission light and the reception light may occur.

Figure 14:
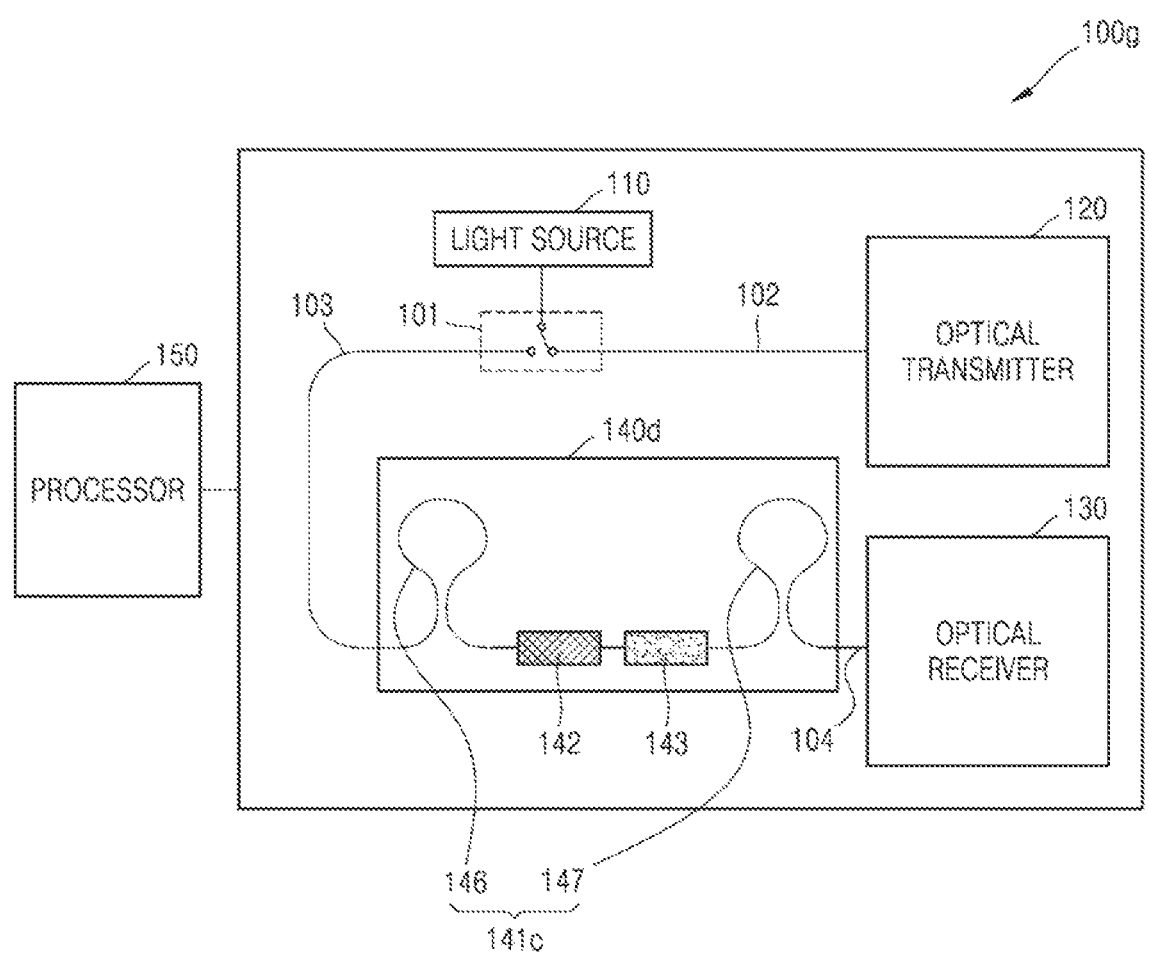
FIG. 14 is a schematic block diagram showing a configuration of a LiDAR apparatus according to another example embodiment.

According to example embodiments, a resonator of a resonance-type photodetector has been described as a closed curve waveguide resonator, but embodiments are not limited thereto. For example, FIG. 14 is a schematic block diagram showing a configuration of a LiDAR apparatus 100g according to another example embodiment. Referring to FIG. 14, a resonance-type photodetector 140d of the LiDAR apparatus 100g may include a loop-type mirror resonator 141c. The loop-type mirror resonator 141c may include a first loop-type mirror 146 and a second loop-type mirror 147 formed on the waveguide.

The first loop-type mirror 146 and the second loop-type mirror 147 may be configured such that parts of the waveguide closely face each other by folding a portion of the waveguide in a loop shape. In a narrow neck portion of the first loop-type mirror 146 and the second loop-type mirror 147, where some portions of the waveguide closely face each other, partial reflection and partial transmission occur. Accordingly, a light resonance effect occurs between the first and second loop-type mirrors 146 and 147, and thus, the first and second loop-type mirrors 146 and 147 may perform as resonators. A phase modulator 142 and an optical detector 143 may be disposed on a waveguide between the first loop-type mirror 146 and the second loop-type mirror 147 in which resonance occurs.

In the example embodiment shown in FIG. 14, a second waveguide 103, the loop-type mirror resonator 141c, and a third waveguide 104 may be integrally configured by using one waveguide. For example, one waveguide may extend from an optical switch 101 to an optical receiver 130, and the first loop-type mirror 146 and the second loop-type mirror 147 may be formed in a middle part of the waveguide. In FIG. 14, a waveguide between the optical switch 101 and the first loop-type mirror 146 is indicated as the second waveguide 103, and a waveguide between the optical receiver 130 and the second loop-type mirror 147 is indicated as a third waveguide 104.

When the optical transmitter 120 and the optical receiver 130 are implemented in an OPA method, the optical transmitter 120 and the optical receiver 130 may be integrated into one chip. In addition, the optical transmitter 120, the optical receiver 130, and the resonance-type photodetector 140 may be integrated into one chip, or the light source 110, the optical transmitter 120, the optical receiver 130, and the resonance-type photodetector 140 may be integrated into one chip. Accordingly, the miniaturization of a LiDAR apparatus may be possible when the optical transmitter 120 and the optical receiver 130 are implemented in an OPA method.

Figure 15:
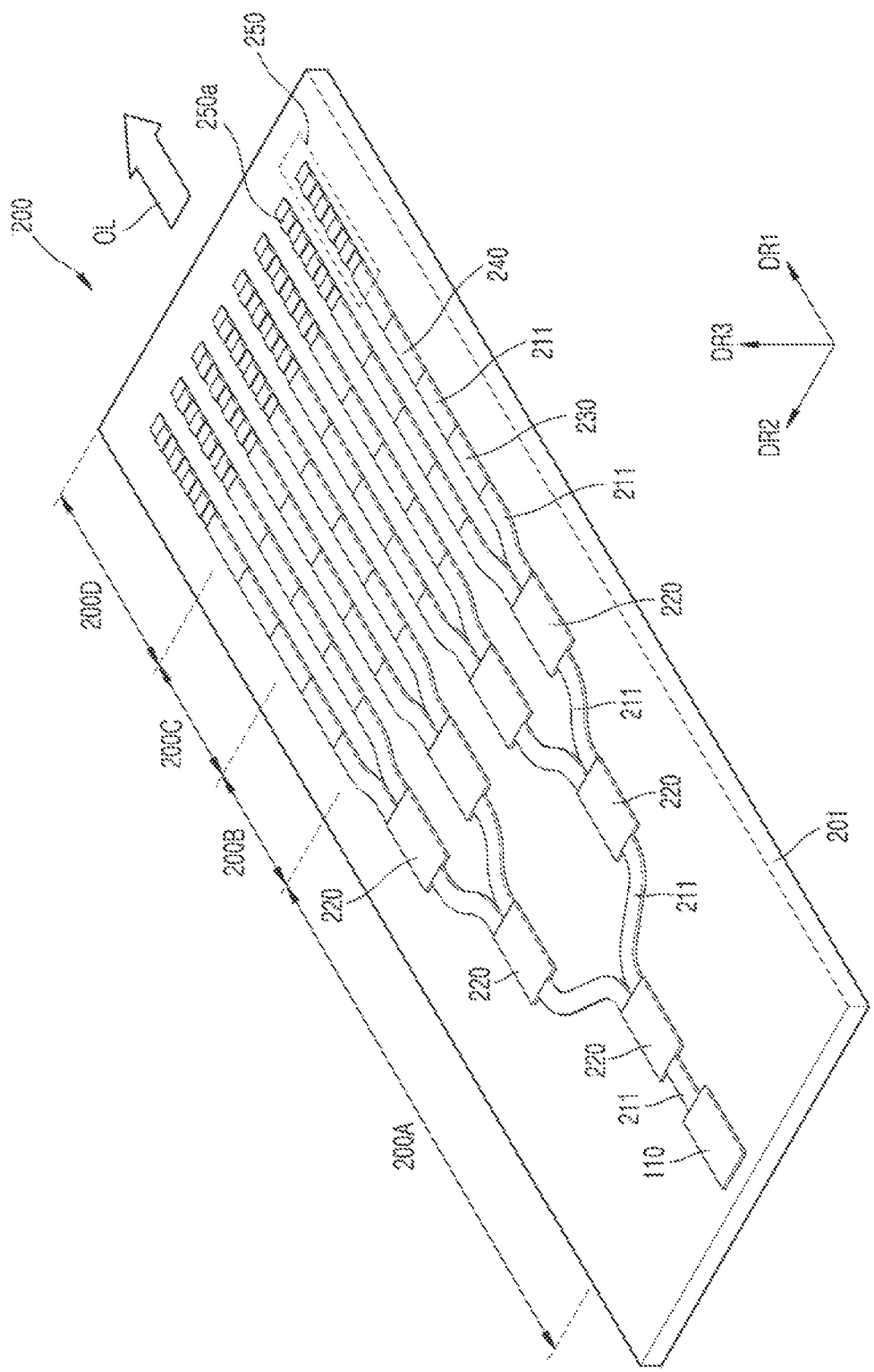
FIG. 15 is a schematic perspective view of a configuration of an OPA device according to an example embodiment.

For example, FIG. 15 is a schematic perspective view of a configuration of an OPA device 200 according to an example embodiment. Referring to FIG. 15, the OPA device 200 may include a substrate 201, a light source 110 on the substrate 201, a splitting region 200A, a phase control region 200B, an amplifying region 200C, and an emission region 200D. The light source 110, the splitting region 200A, the phase control region 200B, the amplifying region 200C, and the emission region 200D may be arranged in a first direction DR1. The OPA device 200 may include a plurality of optical waveguides 211 configured to sequentially transmit light generated by the light source 110 to the splitting region 200A, the phase control region 200B, the amplifying region 200C, and the emission region 200D. Light generated by the light source 110 may travel in the first direction DR1 through the optical waveguides 211. In FIG. 15, as an example, it is depicted that the light source 110 is manufactured integrally with the OPA device 200, but the light source 110 may be manufactured separately from the OPA device 200.

The splitting region 200A may include a plurality of splitters 220. The plurality of splitters 220 may split one light traveling along the optical waveguide 211 into several pieces of light. To this end, one optical waveguide 211 may be connected to an input terminal of each splitter 220 and a plurality of optical waveguides 211 may be connected to an output terminal of each splitter 220. As an example, a plurality of splitters 220 that each split one light into two pieces of light is shown in FIG. 15. Light generated by the light source 110 may be split into a plurality of pieces of light in the splitting region 200A. The split pieces of light travel along the plurality of optical waveguides 211, respectively. In FIG. 15, it is depicted that light generated by the light source 110 is split into eight pieces of light in the splitting region 200A, but 6 embodiments are not limited thereto.

The phase control region 200B may include a plurality of phase control elements 230 respectively disposed in the plurality of optical waveguides 211. For example, the plurality of phase control elements 230 may be arranged in a second direction DR2 perpendicular to the first direction DR1. The plurality of pieces of light split in the splitting region 200A may be respectively provided to the plurality of phase control elements 230. The phase control element 230 may have a variable refractive index that is electrically controlled. Phases of the light passing through the phase control element 230 may be determined according to the refractive index of the phase control element 230. The phase control element 230 may independently control the phases of the split pieces of light.

The amplifying region 200C may include a plurality of optical amplifiers 240 respectively disposed in the plurality of optical waveguides 211. The plurality of optical amplifiers 240 may be arranged in the second direction DR2 perpendicular to the first direction DR1. The optical amplifiers 240 may increase the intensity of an optical signal. For example, each of the optical amplifiers 240 may include a semiconductor optical amplifier or an ion doping amplifier.

The emission region 200D may include a plurality of grating pattern groups 250. The plurality of grating pattern groups 250 may be arranged in the second direction DR2. The plurality of grating pattern groups 250 may be respectively connected to the plurality of optical amplifiers 240. Each of the grating pattern groups 250 respectively may emit light amplified in the amplifying region 200C. To this end, each of the grating pattern groups 250 may include a plurality of grating patterns 250a that are periodically arranged. The plurality of grating patterns 250a may be arranged in the first direction DR1. The traveling direction of output light OL emitted by the grating pattern group 250 may be determined by a phase difference between split pieces of light determined in the phase control region 200B, a gap between the grating patterns 250a, a height of the grating patterns 250a, and a width of the grating patterns 250a. For example, the traveling direction of the output light OL may include a component in the first direction DR1, a component in the second direction DR2, and a component in a third direction DR3 perpendicular to the first direction DR1 and the second direction DR2.

When the OPA device 200 shown in FIG. 15 is used as an optical transmitter, a processor 150 may independently control the plurality of phase control elements 230 to control the phases of a plurality of split pieces of light, thereby an azimuth direction of transmission light emitted through the grating pattern groups 250 may be controlled. For example, transmission light may be emitted in different azimuth directions according to the phase difference set in the plurality of phase control elements 230. An elevation angle direction of signal light emitted through the grating pattern group 250 may be implemented by changing the wavelength of the light source 110. For example, in the wavelength band of 1,310 nm, the elevation angle changes by about 2° when the wavelength is changed by 10 nm.

Also, the OPA device 200 shown in FIG. 15 may also be used as an optical receiver. In this case, the OPA device 200 may operate opposite to the optical transmitter. For example, light may be input through the grating pattern group 250, and the processor 150 may pre-control the phases of the plurality of phase control elements 230 to fit in a direction in which the light input is expected. Light incident from a direction set by the processor 150 may constructively interfere while passing through the plurality of phase control elements 230 and may be combined into a single waveguide, and thus, may be detected by an optical detector. However, light incident from a direction not matching the set direction may destructively interfere while passing through the plurality of phase control elements 230 and may be combined into one waveguide, and thus, may not be detected by an optical detector.

Figure 16:
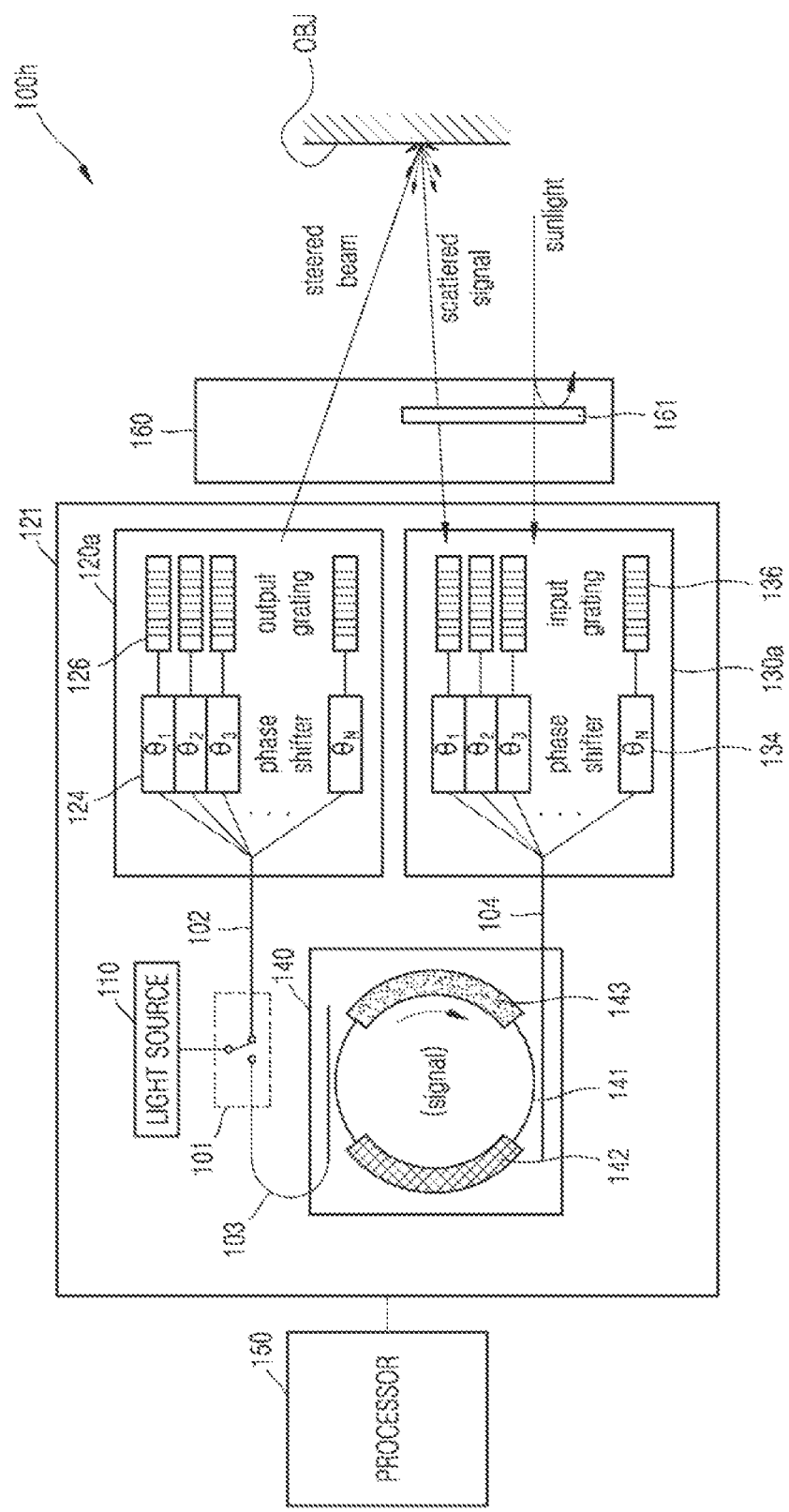
FIG. 16 is a schematic block diagram of a configuration of a LiDAR apparatus including the OPA device of FIG. 15.

FIG. 16 is a schematic block diagram of a configuration of a LiDAR apparatus 100h including the OPA device 200 of FIG. 15. The LiDAR apparatus 100h shown in FIG. 16 has substantially the same configuration as the LiDAR apparatus 100 shown in FIG. 1, but there is a difference in that the LiDAR apparatus 100h includes an optical transmitter 120a and an optical receiver 130a configured of the optical phased array element 200 of FIG. 15. Also, the LiDAR apparatus 100h may include a single substrate 121 on which a light source 110, an optical transmitter 120a, an optical receiver 130a, and a resonance-type photodetector 140 are mounted together. The optical transmitter 120a may include a plurality of phase control elements 124 and a plurality of grating pattern groups 126, and the optical receiver 130a may also include a plurality of phase control elements 134 and a plurality of grating pattern groups 136. The configuration including an OPA device may be applied to all of the LiDAR apparatuses according to all the example embodiments described above as well as the LiDAR apparatus 100 of FIG. 1.

Figure 17:
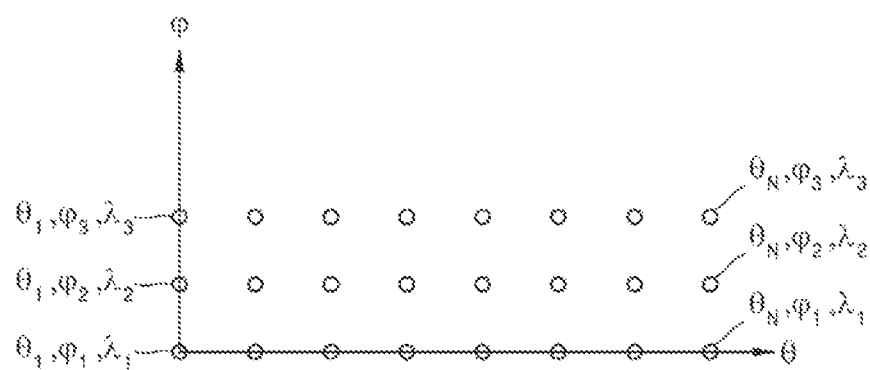
FIG. 17 is a diagram of a distribution of signal light emitted by the LiDAR apparatus of FIG. 16.

The LiDAR apparatus 100h may perform a 2D scanning with respect to a front region by using the optical transmitter 120a and the optical receiver 130a. For example, FIG. 17 is a diagram of a distribution of signal light emitted by the LiDAR apparatus 100h of FIG. 16. As shown in FIG. 17, the LiDAR apparatus 100h may sequentially scan a region from a first azimuth direction $\theta_1$ to an $N^{th}$ azimuth direction $\theta_N$ while a first elevation angle direction $\varphi_1$ is fixed. As described above, an azimuth angle may be controlled by the plurality of phase control elements 124 and an elevation angle may be determined by a wavelength of light generated by the light source 110. The processor 110 may control the light source 110 such that the light source 110 generates light of a first wavelength $\lambda_1$ in order to emit the light in a first elevation angle direction $\varphi_1$.

Then, the LiDAR apparatus 100h may control an elevation angle direction to a second elevation angle direction $\varphi_2$. To this end, the processor 110 may control the light source 110 so that the light source 110 generates light of a second wavelength $\lambda_2$. Also, the processor 110 may control the phase control element 124 to sequentially scan from a first azimuth direction $\theta_1$ to an $N^{th}$ azimuth direction $\theta_N$. Since the wavelength of light generated by the light source 110 may change whenever the elevation angle direction is changed in this manner, the LiDAR apparatus 100h may perform a tuning mode, that is, the LiDAR apparatus 100h may match a resonance wavelength of the resonator 141 to a wavelength of light generated by the light source 110 by controlling the phase modulator 142 of the resonance-type photodetector 140 whenever the elevation angle direction is changed.

Figure 18:
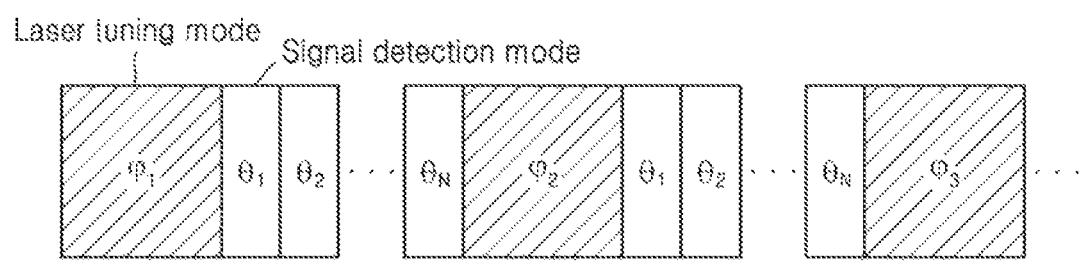
FIG. 18 is a diagram of a driving method of the LiDAR apparatus of FIG. 16.

For example, FIG. 18 is a diagram of a driving method of the LiDAR apparatus 100h of FIG. 16. Referring to FIG. 18, the processor 150 may control the light source 110 such that the light source 110 generates light of a first wavelength $\lambda_1$ in order to emit light in a first elevation angle direction $\varphi_1$. In a tuning mode, the resonance wavelength of the resonator 141 may be matched to the first wavelength $\lambda_1$ by providing light of the first wavelength $\lambda_1$ to the resonator 141, and controlling the phase of the light traveling along the resonator 141 by controlling the phase modulator 142. Afterwards, in a signal detection mode, the processor 150 may sequentially control an azimuth direction of light emitted by the optical transmitter 120a from a first azimuth direction $\theta_1$ to an $N^{th}$ azimuth direction $\theta_N$ by controlling the plurality of the phase control elements 124 while providing light of the first wavelength $\lambda_1$ generated by the light source 110 to the optical transmitter 120a.

When a scanning with respect to the first elevation angle direction $\varphi_1$ is completed, the processor 150 may control the light source 110 such that the light source 110 generates light of a second wavelength $\lambda_2$ in order to emit light in a second elevation angle direction $\varphi_2$. In a tuning mode, the resonance wavelength of the resonator 141 may be matched to the second wavelength $\lambda_2$ by providing light of the second wavelength $\lambda_2$ to the resonator 141, and controlling the phase of the light traveling along the resonator 141 by controlling the phase modulator 142. Afterwards, in a signal detection mode, the processor 150 may sequentially control an azimuth direction of light emitted by the optical transmitter 120a from a first azimuth direction $\theta_1$ to an $N^{th}$ azimuth direction $\theta_N$ by controlling the plurality of the phase control elements 124 while providing light of the second wavelength $\lambda_2$ generated by the light source 110 to the optical transmitter 120a.

Figure 19:
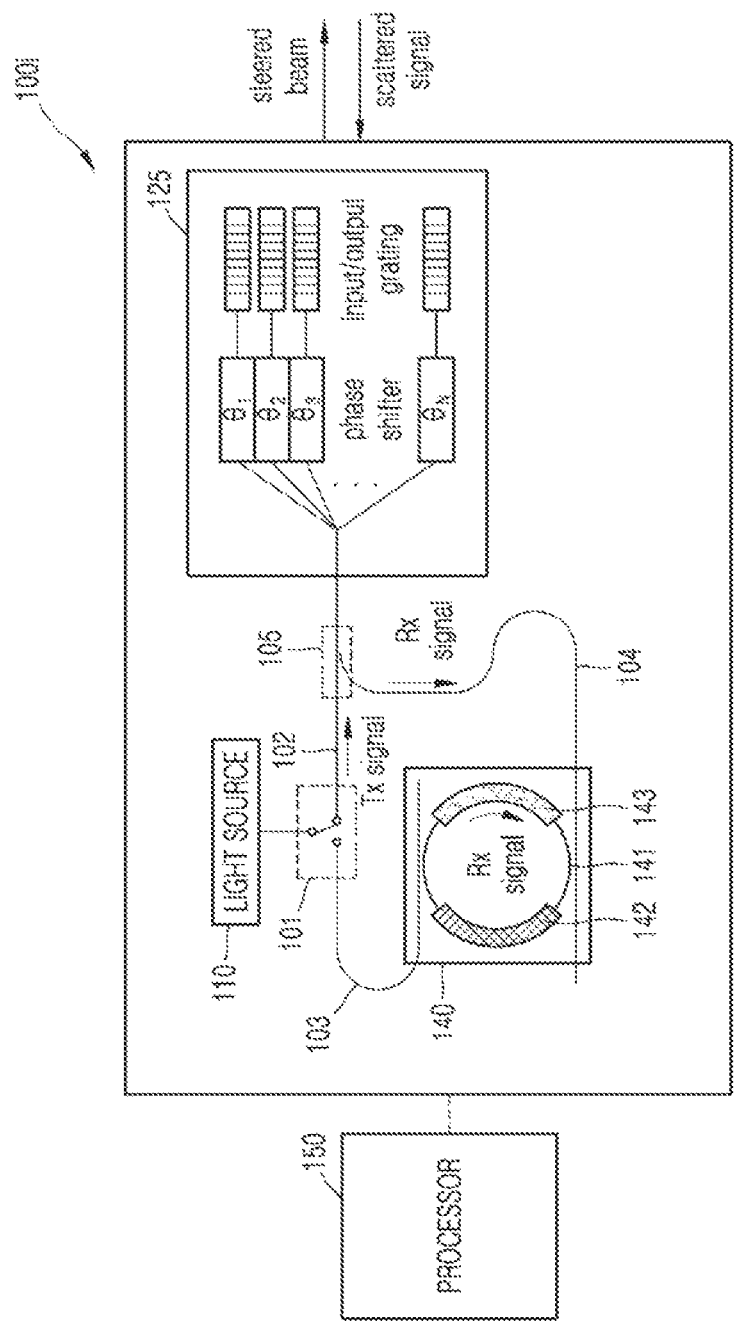
FIG. 19 is a schematic block diagram of a configuration of a LiDAR apparatus according to another example embodiment.

Also, when an OPA device is used, the optical transmitter 120a and the optical receiver 130a described above may be integrally combined as one optical transceiver to be manufactured. For example, FIG. 19 is a schematic block diagram of a configuration of a LiDAR apparatus according to another example embodiment. Referring to FIG. 19, the LiDAR apparatus 100i may include a light source 110, an optical transceiver 125, and a resonance-type photodetector 140. The optical transceiver 125 includes an OPA device and may perform as both an optical transmitter and an optical receiver.

Also, the LiDAR apparatus 100i may include a first waveguide 102 between the light source 110 and the optical transceiver 125, a second waveguide 103 between the light source 110 and a resonator 141 of the resonance-type photodetector 140, a third waveguide 104 between the optical transceiver 125 and the resonator 141, an optical switch 101 that provides light generated by the light source 110 to the first waveguide 102 or the second waveguide 103 according to the control of the processor 150, and an optical coupler 105 on the first waveguide 102. A first end of the third waveguide 104 is connected to the optical coupler 105. The optical coupler 105 may transmit light coming from the first waveguide 102 to the optical transceiver 125 and transmit light received from the optical transceiver 125 to the third waveguide 104.

Figure 20:
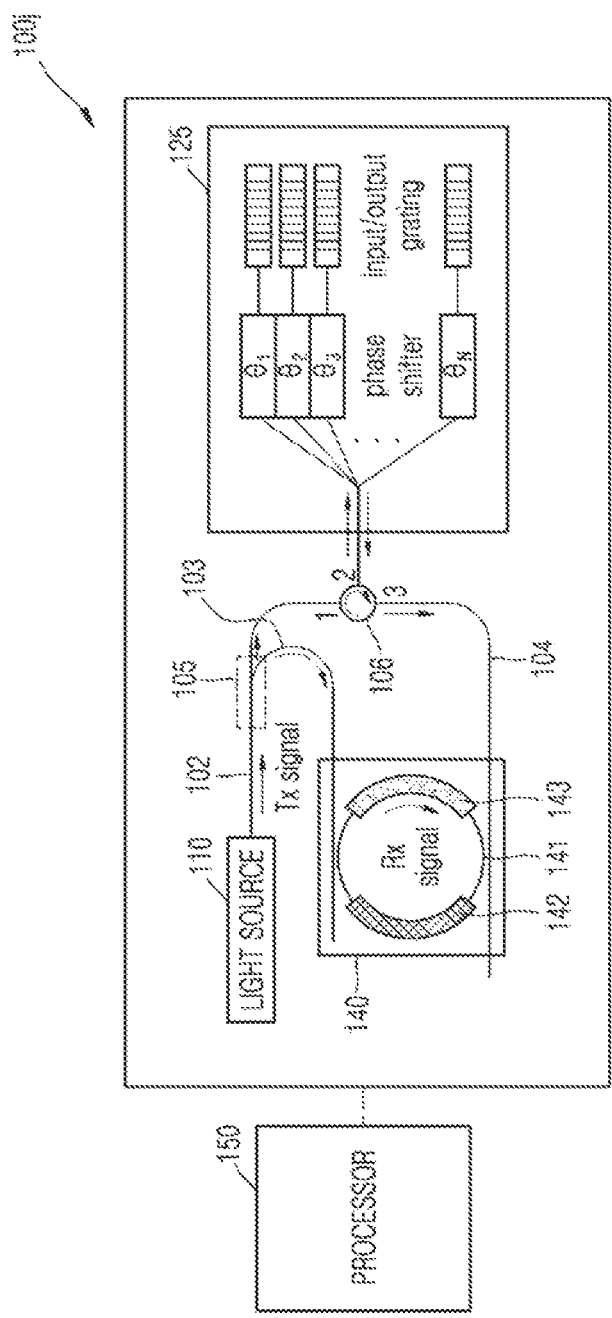
FIG. 20 is a schematic block diagram of a configuration of a LiDAR apparatus according to another example embodiment.

FIG. 20 is a schematic block diagram of a configuration of a LiDAR apparatus 100j according to another example embodiment. Referring to FIG. 20, the LiDAR apparatus 100j may include a light source 110, an optical transceiver 125, and a resonance-type photodetector 140. Also, the LiDAR apparatus 100j may include an optical circulator 106 that outputs light incident on a first port to a second port and outputs light incident on the second port to a third port, a first waveguide 102 connected between the light source 110 and the first port of the optical circulator 106, an optical coupler 105 on the first waveguide 102, a second waveguide 103 connected between a resonator 141 and the optical coupler 105, and a third waveguide 104 connected between the resonator 141 and the third port of the optical circulator 106.

Light generated by the light source 110 may be spilt at the optical coupler 105 and supplied to the resonator 141 and the first port of the optical circulator 106. Light supplied to the first port of the optical circulator 106 may be output to the second port and transmitted to the optical transceiver 125. In addition, light received by the optical transceiver 125 may be input to the second port of the optical circulator 106 and output to the third port of the optical circulator 106. Further, the light output through the third port of the optical circulator 106 may be provided to the resonator 141 through the third waveguide 104. Accordingly, signal light and the reception light are simultaneously provided to the resonator 141, and the LiDAR apparatus 100j of FIG. 20 may calculate information on an object in front, for example, in a FMCW method.

The LiDAR apparatuses described above may be mounted, for example, on a vehicle and configured to extract distance and relative speed information with respect to vehicles around the LiDAR apparatus. However, the LiDAR apparatuses according to the example embodiments are not necessarily applicable only to a vehicle. For example, the LiDAR apparatuses may be mounted on a ship, an aircraft, or a drone in addition to a vehicle, and may be used to search for and avoid obstacles in front of the ship, aircraft, or drone, etc.

It should be understood that example embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A light detection and ranging (LiDAR) apparatus comprising:
   a light source configured to generate light;
   an optical transmitter configured to emit the light generated by the light source to outside of the LiDAR apparatus;
   an optical receiver configured to receive light from the outside of the LiDAR apparatus;
   a resonance-type photodetector configured to selectively amplify and detect light having a wavelength that is the same as a wavelength of the light generated by the light source among the light received by the optical receiver; and
   a processor configured to control the light source and the resonance-type photodetector,
   wherein the resonance-type photodetector comprises:

a resonator;
a phase modulator provided on the resonator and configured to control a phase of light traveling along the resonator based on control of the processor; and
an optical detector configured to detect an intensity of the light traveling along the resonator,
wherein the optical transmitter comprises:
a substrate;
a plurality of waveguides provided on the substrate;
a plurality of splitters respectively comprising an input terminal connected to one waveguide among the plurality of waveguides and an output terminal connected to at least two waveguides among the plurality of waveguides;
a plurality of phase control elements configured to independently control phases of a plurality of pieces of light split by the plurality of splitters; and
a plurality of grating pattern groups respectively connected to the plurality of phase control elements and configured to emit the plurality of pieces of light of which phases are controlled.

2. The LiDAR apparatus of claim 1, wherein the processor is further configured to:
provide the light generated by the light source to the resonator before providing the light to the optical transmitter;
match a resonance wavelength of the resonator with the wavelength of light generated by the light source by adjusting the phase of the light traveling along the resonator by controlling the phase modulator; and
provide the light generated by the light source to the optical transmitter after determining the resonance wavelength of the resonator.

3. The LiDAR apparatus of claim 2, wherein the processor is further configured to determine that the resonance wavelength of the resonator is matched with the wavelength of light generated by the light source when an intensity of light detected by the resonance-type photodetector reaches a maximum value while adjusting the phase of the light traveling along the resonator by controlling the phase modulator.

4. The LiDAR apparatus of claim 2, further comprising a temperature sensor configured to measure a temperature of the light source,
wherein the processor is further configured to:
determine the wavelength of the light generated by the light source based on the temperature measured by the temperature sensor, and
based on the wavelength of light generated by the light source changing beyond a predetermined range, match the resonance wavelength of the resonator with the wavelength of light generated by the light source by adjusting the phase of the light traveling along the resonator by controlling the phase modulator.

5. A light detection and ranging (LiDAR) apparatus comprising:
a light source configured to generate light;
an optical transmitter configured to emit the light generated by the light source to outside of the LiDAR apparatus;
an optical receiver configured to receive light from the outside of the LiDAR apparatus;
a resonance-type photodetector configured to selectively amplify and detect light having a wavelength that is the same as a wavelength of the light generated by the light source among the light received by the optical receiver,
wherein the resonance-type photodetector comprises:
a resonator;
a phase modulator provided on the resonator and configured to control a phase of light traveling along the resonator based on control of the processor; and
an optical detector configured to detect an intensity of the light traveling along the resonator;
a processor configured to control the light source and the resonance-type photodetector;
a first waveguide provided between the light source and the optical transmitter;
a second waveguide provided between the light source and the resonator;
a third waveguide provided between the optical receiver and the resonator; and
an optical switch configured to provide the light generated by the light source to the first waveguide or to the second waveguide based on control of the processor.

6. The LiDAR apparatus of claim 5, further comprising an additional optical detector connected to an end of the third waveguide, the additional optical detector being configured to measure an intensity of external noise.

7. The LiDAR apparatus of claim 5, further comprising an optical coupler on the first waveguide,
wherein an end of the second waveguide extends to the optical coupler, and a portion of the light provided to the optical transmitter through the first waveguide is provided to the resonator through the optical coupler and the second waveguide.

8. The LiDAR apparatus of claim 7, wherein the light source comprises a continuous wave light source that is configured to generate continuous wave light, and
wherein the processor is further configured to:
control the light source to generate frequency modulated light, and
extract at least one of distance information of an external object and speed information of the external object in a frequency modulated continuous wave (FMCW) method.

9. A light detection and ranging (LiDAR) apparatus comprising:
a light source configured to generate light;
an optical transmitter configured to emit the light generated by the light source to outside of the LiDAR apparatus;
an optical receiver configured to receive light from the outside of the LiDAR apparatus;
a resonance-type photodetector configured to selectively amplify and detect light having a wavelength that is the same as a wavelength of the light generated by the light source among the light received by the optical receiver; and
a processor configured to control the light source and the resonance-type photodetector,
wherein the resonance-type photodetector comprises:
a resonator;
a phase modulator provided on the resonator and configured to control a phase of light traveling along the resonator based on control of the processor; and
an optical detector configured to detect an intensity of the light traveling along the resonator,
wherein the resonator comprises a first resonator and a second resonator that have different optical path lengths and are optically connected to each other,
wherein the phase modulator comprises a first phase modulator provided on the first resonator and configured to control a phase of light traveling along the first resonator based on the control of the processor, and a second phase modulator provided on the second resonator and configured to control a phase of light traveling along the second resonator based on the control of the processor, and wherein the optical detector comprises a first optical detector configured to detect an intensity of the light traveling along the first resonator and a second optical detector configured to detect an intensity of the light traveling along the second resonator.

10. The LiDAR apparatus of claim 9, wherein the processor is further configured to:

provide the light generated by the light source to the first resonator before providing the light generated by the light source to the optical transmitter, match a resonance wavelength of the first resonator with the wavelength of light generated by the light source by adjusting the phase of the light traveling along the first resonator by controlling the first phase modulator, match a resonance wavelength of the second resonator with the wavelength of light generated by the light source by adjusting the phase of the light traveling along the second resonator by controlling the second phase modulator, and provide the light generated by the light source to the optical transmitter after determining the resonance wavelength of the first resonator and the resonance wavelength of the second resonator.

11. The LiDAR apparatus of claim 9, further comprising:
a first waveguide provided between the light source and the optical transmitter;
a second waveguide provided between the light source and the first resonator;
a third waveguide provided between the optical receiver and the second resonator; and
an optical switch configured to provide the light generated by the light source to the first waveguide or to the second waveguide based on control of the processor.

12. The LiDAR apparatus of claim 1, further comprising:
a first waveguide provided between the light source and the optical transmitter;
an optical coupler provided on the first waveguide;
a second waveguide provided between the optical coupler and the resonator; and
a third waveguide provided between the optical receiver and the resonator,
wherein a portion of the light provided to the optical transmitter through the first waveguide is provided to the resonator through the optical coupler and the second waveguide.

13. The LiDAR apparatus of claim 1, wherein the resonator comprises a closed curve waveguide resonator.

14. The LiDAR apparatus of claim 1, wherein the resonator comprises a first loop-type mirror and a second loop-type mirror provided on a waveguide, and
wherein the phase modulator and the optical detector are provided on the waveguide between the first loop-type mirror and the second loop-type mirror.

15. The LiDAR apparatus of claim 14, further comprising:
a first waveguide provided between the light source and the optical transmitter;
a second waveguide provided between the light source and the first loop-type mirror;
a third waveguide provided between the optical receiver and the second loop-type mirror; and an optical switch configured to provide the light generated by the light source to the first waveguide or to the second waveguide based on control of the processor.

16. The LiDAR apparatus of claim 1, wherein the light source, the optical transmitter, the optical receiver, and the resonance-type photodetector are provided on a single substrate.

17. The LiDAR apparatus of claim 1, wherein the processor is further configured to:
control an azimuth direction of the light emitted by the optical transmitter by adjusting the phases of split light by controlling the plurality of phase control elements, and
control an elevation angle direction of the light emitted by the optical transmitter by controlling the wavelength of the light generated by the light source.

18. The LiDAR apparatus of claim 17, wherein the processor is further configured to match a resonance wavelength of the resonator with the wavelength of the light generated by the light source by controlling the phase modulator based on a change in the elevation angle direction of the light emitted by the optical transmitter.

19. The LiDAR apparatus of claim 18, wherein the processor is further configured to:
control the light source to generate light of a first wavelength,
provide the light of the first wavelength generated by the light source to the resonator,
match the resonance wavelength of the resonator with the first wavelength by adjusting the phase of the light traveling along the resonator by controlling the phase modulator,
control the azimuth direction of the light emitted by the optical transmitter by controlling the plurality of phase control elements while providing the light of the first wavelength generated by the light source to the optical transmitter,
control the light source to generate light of a second wavelength,
provide the light of the second wavelength generated by the light source to the resonator,
match the resonance wavelength of the resonator with the second wavelength by adjusting the phase of the light traveling along the resonator by controlling the phase modulator, and
control the azimuth direction of the light emitted by the optical transmitter by controlling the plurality of phase control elements while providing the light of the second wavelength generated by the light source to the optical transmitter.

20. The LiDAR apparatus of claim 1, wherein the optical transmitter and the optical receiver are integrally combined as one optical transceiver.

21. The LiDAR apparatus of claim 20, further comprising:
a first waveguide provided between the light source and the optical transceiver;
a second waveguide provided between the light source and the resonator;
a third waveguide provided between the optical transceiver and the resonator;
an optical switch configured to provide the light generated by the light source to the first waveguide or to the second waveguide based on control of the processor; and
an optical coupler provided on the first waveguide, wherein an end of the third waveguide is connected to the optical coupler, and the optical coupler is configured to transmit the light received from the optical transceiver to the third waveguide.

22. The LiDAR apparatus of claim 20, further comprising:
an optical circulator configured to output light incident on a first port of the optical circulator to a second port of the optical circulator, and output light incident on the second port of the optical circulator to a third port of the optical circulator;
a first waveguide connected between the light source and the first port of the optical circulator;
an optical coupler provided on the first waveguide;
a second waveguide connected between the resonator and the optical coupler; and
a third waveguide connected between the third port of the optical circulator and the resonator,
wherein the optical transceiver is connected to the second port of the optical circulator.

* * * * *